US010381837B2

(12) United States Patent
Hoepfner et al.

(10) Patent No.: US 10,381,837 B2
(45) Date of Patent: Aug. 13, 2019

(54) PHOTOVOLTAIC SYSTEMS AND RELATED TECHNIQUES

(71) Applicant: Fraunhofer USA, Inc., Plymouth, MI (US)

(72) Inventors: Christian Hoepfner, Cambridge, MA (US); Dirk E. Mahling, Bainbridge Island, WA (US); Matthew Alan Kromer, Arlington, MA (US); James R. Perkinson, Winchester, MA (US)

(73) Assignee: Fraunhofer USA, Inc., Plymouth, MI (US)

( * ) Notice: Subject to any disclaimer, the term of this patent is extended or adjusted under 35 U.S.C. 154(b) by 585 days.

(21) Appl. No.: 14/799,325

(22) Filed: Jul. 14, 2015

(65) Prior Publication Data

US 2016/0036372 A1 Feb. 4, 2016

Related U.S. Application Data

(60) Provisional application No. 62/081,440, filed on Nov. 18, 2014, provisional application No. 62/066,334, (Continued)

(51) Int. Cl.
*H02J 3/38* (2006.01)
*H02S 40/34* (2014.01)
(Continued)

(52) U.S. Cl.
CPC .............. *H02J 3/383* (2013.01); *G05B 15/02* (2013.01); *G05B 17/00* (2013.01); *H02S 10/00* (2013.01);
(Continued)

(58) Field of Classification Search
CPC .......... H02J 3/383; H02S 40/34; H02S 40/36; H02S 40/38; H02S 50/10; H02S 50/00;
(Continued)

(56) References Cited

U.S. PATENT DOCUMENTS

| 7,531,740 B2 | 5/2009 | Flaherty et al. |
| 2006/0162772 A1 | 7/2006 | Presher, Jr. et al. |

(Continued)

OTHER PUBLICATIONS

U.S. Appl. No. 14/799,312, filed Jul. 14, 2015, Del Olmo et al.
(Continued)

*Primary Examiner* — Feifei Yeung Lopez
(74) *Attorney, Agent, or Firm* — Wolf, Greenfield & Sacks, P.C.

(57) ABSTRACT

Photovoltaic systems and related techniques are provided. A method for commissioning a photovoltaic (PV) system may include obtaining data describing an arrangement of two or more components of the PV system; performing a test of the PV system, wherein performing the test includes determining whether the PV system complies with at least one PV system criterion based, at least in part, on at least a portion of the data describing the arrangement of the two or more components of the PV system; and in response to determining that the PV system complies with the at least one PV system criterion, activating the PV system and/or notifying a user of the PV system that the PV system complies with the at least one PV system criterion. The method may further include sending information associated with the PV system to a regulatory entity and/or an operator of an electrical grid.

20 Claims, 9 Drawing Sheets

Related U.S. Application Data filed on Oct. 20, 2014, provisional application No. 62/031,840, filed on Jul. 31, 2014.

(51) Int. Cl.

| | |
|---|---|
| *H02S 40/36* | (2014.01) |
| *H02S 50/00* | (2014.01) |
| *H02S 40/38* | (2014.01) |
| *G05B 17/00* | (2006.01) |
| *H02S 50/10* | (2014.01) |
| *G05B 15/02* | (2006.01) |
| *H02S 10/00* | (2014.01) |

(52) U.S. Cl.
CPC .............. *H02S 40/34* (2014.12); *H02S 40/36* (2014.12); *H02S 40/38* (2014.12); *H02S 50/00* (2013.01); *H02S 50/10* (2014.12); *Y02B 10/12* (2013.01); *Y02B 10/14* (2013.01); *Y02E 10/563* (2013.01)

(58) Field of Classification Search
CPC ......... H02S 10/00; G05B 17/00; Y02B 10/12; Y02B 10/14; Y02E 10/563
See application file for complete search history.

(56) References Cited

U.S. PATENT DOCUMENTS

| | | | |
|---|---|---|---|
| 2009/0141522 A1* | 6/2009 | Adest ................ | H02J 1/102 363/55 |
| 2009/0187873 A1 | 7/2009 | Nikitin et al. | |
| 2009/0308426 A1 | 12/2009 | Kernahan | |
| 2010/0139734 A1 | 6/2010 | Hadar et al. | |
| 2011/0199707 A1* | 8/2011 | Kazemi ................ | H02H 7/1222 361/47 |
| 2012/0152325 A1 | 6/2012 | Podkin et al. | |
| 2013/0026839 A1 | 1/2013 | Grana | |
| 2013/0342389 A1 | 12/2013 | Cojocaru et al. | |
| 2014/0025344 A1* | 1/2014 | Brier .................. | G06F 17/5063 703/1 |
| 2014/0125125 A1 | 5/2014 | Wyatt | |
| 2015/0001964 A1* | 1/2015 | Duda ................ | H02J 1/12 307/116 |
| 2016/0036234 A1 | 2/2016 | Del Olmo et al. | |
| 2016/0036373 A1 | 2/2016 | Hoepfner et al. | |
| 2016/0036381 A1 | 2/2016 | Kromer et al. | |

OTHER PUBLICATIONS

U.S. Appl. No. 14/799,343, filed Jul. 14, 2015, Kromer et al.
U.S. Appl. No. 14/799,365, filed Jul. 14, 2015, Hoepfner et al.
Barbose et al., Tracking the Sun VI—An Historical Summary of the Installed Price of Photovoltaics in the United States from 1998 to 2012. Lawrence Berkeley National Laboratory. Jul. 2013.
Barbose et al., Why Are Residential PV Prices in Germany So Much Lower Than in the United States?—A Scoping Analysis. Lawrence Berkeley National Laboratory. Feb. 2013.
Hall, Fraunhofer granted $11 million Sunshot plug-and-play grant. PV Magazine Global. <http://www.pv-magazine.com/news/details/beitrag/fraunhofer-granted-11-million-sunshot-plug-and-play-grant_100009629/#axzz3OFEXSatP> (accessed Oct. 26, 2015). Dec. 12, 2012.
Kelly-Detwiler, Plug-and-Play Residential Solar in Five Years? Fraunhofer USA and Partners Are Working to Make This a Reality. Forbes. <http://www.forbes.com/sites/peterdetwiler/2013/08/07/plug-and-play-residential-solar-in-five-years-fraunhofer-usa-and-partners-are-working-to-make-this-a-reality/?ss=business:energy> (accessed Oct. 26, 2015). Aug. 7, 2013.
Movellan, Plug-and-Play Solar Systems: Automating the Permitting, Insepction, and Interconnection Processes. Renewable Energy World. <http://www.renewableenergyworld.com/articles/2014/06/plug-and-play-solar-systems-automating-the-permitting-inspection-and-interconnection-processes.html> (accessed Oct. 26, 2015). Jun. 19, 2014.
[No Author Listed], DOE Pursues SunShot Initiative to Achieve Cost Competitive Solar Energy by 2020. Office of Energy Efficiency and Renewable Energy. Feb. 4, 2011. 4 pages.
Holt, NEC Rules on Alternative Energy Systems—Part 1. EC&M. http://www.ecmweb.com/code-basics/nec-rules-alternative-energy-systems-part-1 Sep. 10, 2012. 6 pages.
Shiva, Computer Hardware Description Language—A Tutorial. Proceedings of the IEEE. 1979;67(12):1605-15. http://ieeexplore.ieee.org/stamp/stamp.jsp?arnumber=1455810.

\* cited by examiner

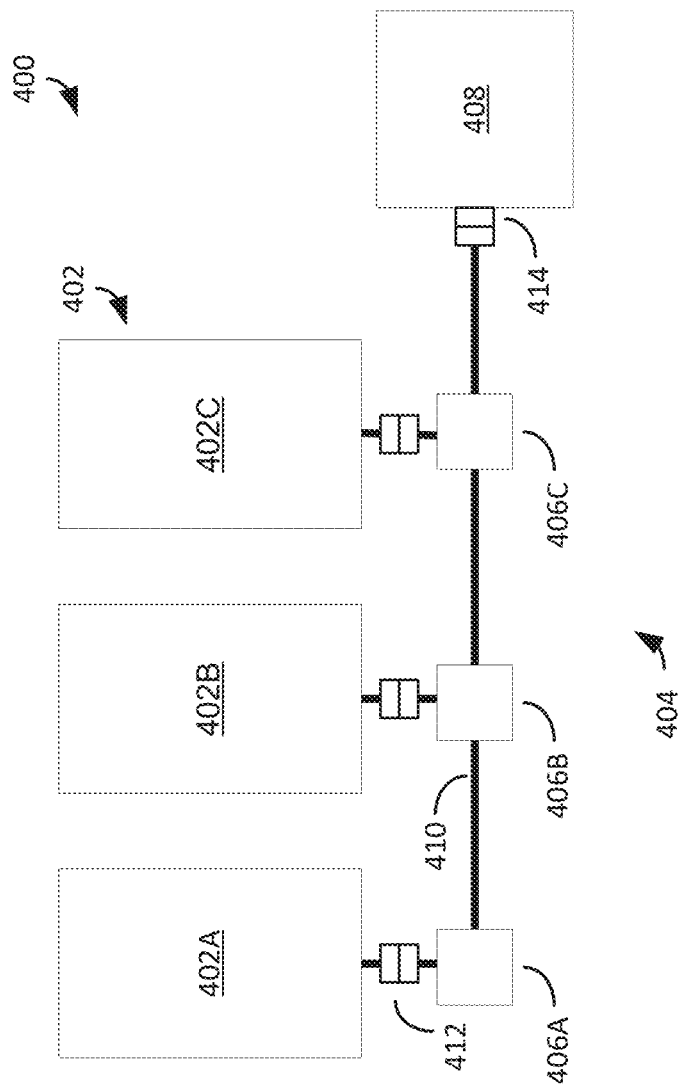

PHOTOVOLTAIC SYSTEMS AND RELATED TECHNIQUES

CROSS-REFERENCE TO RELATED APPLICATIONS

This application claims priority under 35 U.S.C. § 119(e) to U.S. Provisional Application Ser. No. 62/031,840, titled "Plug and play solar energy system" and filed on Jul. 31, 2014, U.S. Provisional Application Ser. No. 62/066,334, titled "Photovoltaic systems and related techniques" and filed on Oct. 20, 2014, and U.S. Provisional Application Ser. No. 62/081,440, titled "Photovoltaic systems and related techniques" and filed on Nov. 18, 2014, each of which is herein incorporated by reference in its entirety.

FEDERALLY SPONSORED RESEARCH

This invention was made with Government support under Award No. DE-EE0006035 awarded by the U.S. Department of Energy Office of Energy Efficiency and Renewable Energy. The Government has certain rights in the invention.

BACKGROUND

Technical Field

The techniques described herein relate generally to photovoltaic (PV) systems. Some embodiments relate to apparatus and techniques for commissioning premises PV systems.

Discussion of the Related Art

Photovoltaic power systems ("PV power systems" or "PV systems") generate electrical power by converting sunlight into electricity. PV systems typically use photovoltaic panels ("PV panels," "solar panels," or "panels") of photosensitive cells to convert sunlight into direct current (DC) electricity. In a premises PV system, the PV panels may be mounted on the ground or on the roof of a premises (e.g., a residential house), and the electricity generated by the PV panels may be used to provide power to electrical loads on the premises. The amount of electrical power generated by a premises PV system may exceed the power demands of the premises during the day. Some premises PV systems provide power to the electrical grid at times when the PV system generates more power than the premises needs.

SUMMARY

In one embodiment, there is provided a method for commissioning a photovoltaic (PV) system to be installed at a premises. The PV system comprises a plurality of PV panels and electrical components to connect the plurality of PV panels and an electrical grid. The PV system further comprises a PV system controller comprising at least one processor and at least one transceiver to communicate from the PV system to one or more devices outside the premises. The method comprises obtaining, with the PV system controller of the PV system, data describing an arrangement of two or more components of the PV system. The two or more components comprise at least some of the plurality of PV panels and at least some of the electrical components of the PV system. The method further comprises performing, with the at least one processor, a test of the PV system, wherein performing the test includes determining, based, at least in part, on at least a portion of the data describing the arrangement of the two or more components of the PV system, whether the PV system complies with at least one PV system criterion. The method further comprises, in response to determining that the PV system complies with the at least one PV system criterion, activating the PV system and/or notifying a user of the PV system that the PV system complies with the at least one PV system criterion.

In another embodiment, there is provided at least one non-transitory computer-readable storage medium having encoded thereon executable instructions that, when executed by at least one processor of a photovoltaic (PV) system controller of a PV system to be installed at a premises, cause the at least one processor to carry out a method for commissioning the PV system. The PV system comprises a plurality of PV panels and electrical components to connect the plurality of PV panels and an electrical grid. The PV system further comprises a PV system controller comprising at least one processor and at least one transceiver to communicate from the PV system to one or more devices outside the premises. The method comprises obtaining, with the PV system controller of the PV system, data describing an arrangement of two or more components of the PV system. The two or more components comprise at least some of the plurality of PV panels and at least some of the electrical components of the PV system. The method further comprises performing, with the at least one processor, a test of the PV system, wherein performing the test includes determining, based, at least in part, on at least a portion of the data describing the arrangement of the two or more components of the PV system, whether the PV system complies with at least one PV system criterion. The method further comprises, in response to determining that the PV system complies with the at least one PV system criterion, activating the PV system and/or notifying a user of the PV system that the PV system complies with the at least one PV system criterion.

BRIEF DESCRIPTION OF THE DRAWINGS

Various aspects and embodiments will be described with reference to the following figures. It should be appreciated that the figures are not necessarily drawn to scale. Items appearing in multiple figures are indicated by the same reference number in all the figures in which they appear. For purposes of clarity, not every component may be labeled in every drawing. In the drawings:

FIG. 4 is a sketch of an example of a cable assembly with which some embodiments may operate;

DETAILED DESCRIPTION

Figure 1:
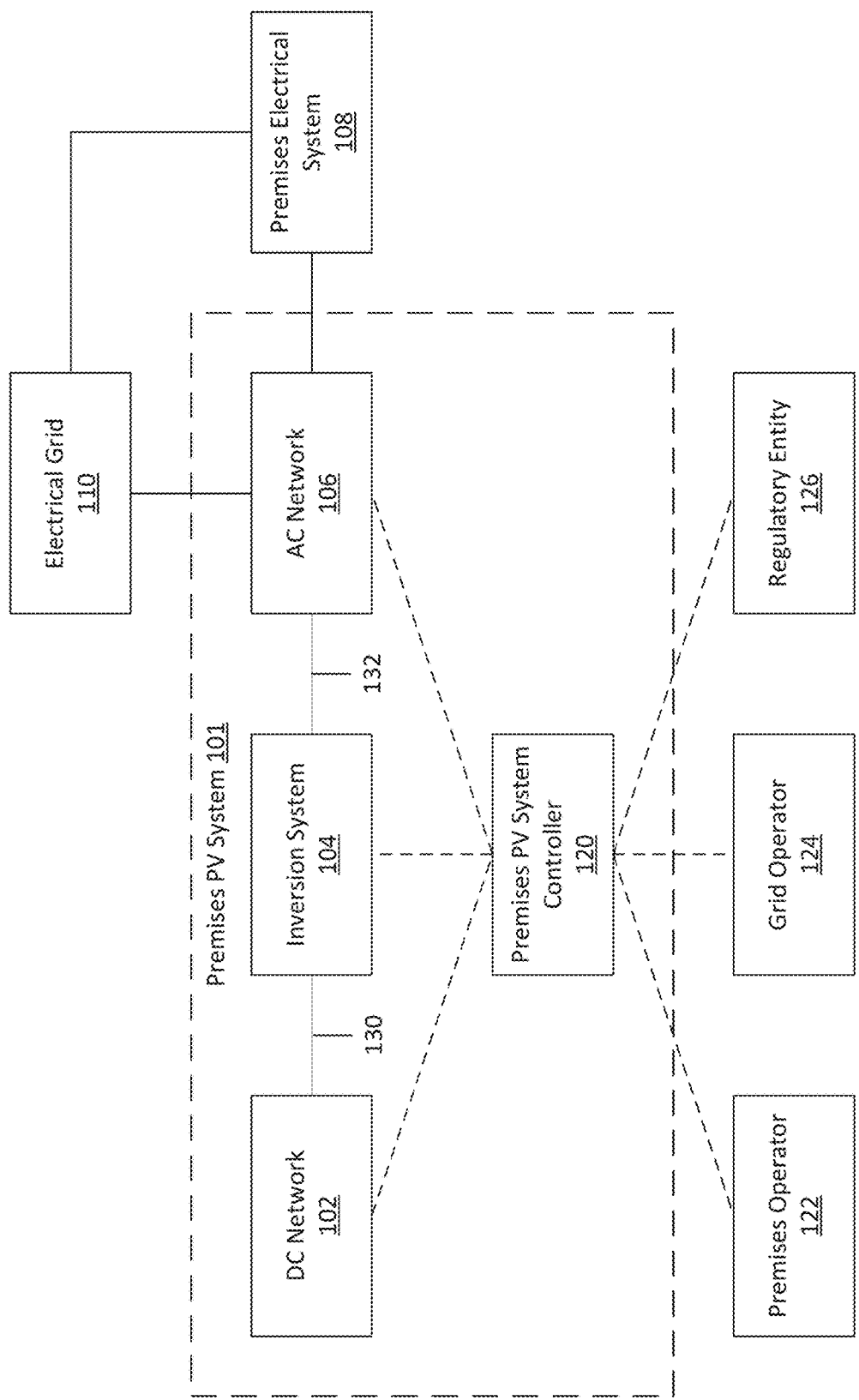
FIG. 1 is a block diagram illustrating a premises photovoltaic (PV) system, according to some embodiments.

As the cost of purchasing and installing PV systems continues to decrease, the use of PV systems to convert solar power into electrical power continues to increase. However, the "soft costs" associated with purchasing and installing PV systems remain substantial, and are a significant barrier to more widespread adoption of solar power technologies. These "soft costs" include any costs other than the cost of the physical components of the PV system (e.g., the costs of designing, installing, and commissioning the PV system). Notable examples of soft costs include compensation for laborers (e.g., electricians, building contractors) who install a PV system on a premises, administrative expenses associated with obtaining a permit from a local regulatory entity (e.g., a building and/or electrical inspector, zoning board, or other department or agency associated with a municipality, county, state, military base, or other authority having jurisdiction over a premises) to install and operate a PV system (including, for example, expenses associated with demonstrating that the PV system is in compliance with applicable regulations and codes), and administrative expenses associated with obtaining approval to connect a PV system to the electrical grid, and the costs associated with obtaining permits. Such soft costs may account for over half the cost of purchasing and installing a conventional residential PV system.

A typical process of purchasing and installing a conventional residential PV system may include five phases: design, pre-installation permitting, installation, inspection, and connection to the electrical grid.

In the design phase for a residential system, a residential PV system provider inspects a prospective purchaser's house to determine how to configure a PV system to provide the house with the desired power generation capacity (e.g., how many panels to use, where to install the panels, etc.). The provider generates a proposed PV system specification, which identifies the proposed PV system's components and specifies how those components are to be configured and interconnected.

In the pre-installation permitting phase, the specification for the proposed PV system is submitted to a local regulatory entity to obtain a permit for installing the PV system. The local regulatory entity's decision to grant or deny the permit is typically based on a determination as to whether the proposed PV system complies with applicable codes (e.g., building safety codes, electrical safety codes, ordinances, regulations, and/or other applicable standards). In the United States, different authorities (e.g., towns, cities, counties, states, military bases) may use different codes (e.g., building codes and/or electrical codes) or standards, such that a permit for a given PV system might be granted in one jurisdiction and denied in another. The inventors have observed that the uncertainty and non-uniformity of the permitting process curb the market for residential PV systems and the prevalence of solar power generation by increasing the expense associated with designing a code-compliant PV system.

If the purchaser of the PV system wishes to connect the PV system to the electrical grid (e.g., to deliver the PV system's excess electrical power to the electrical grid), an interconnection request may be submitted to the grid's operator (e.g., a utility company). In some cases, the grid operator's process for evaluation of such a request may take months to complete and/or may require the PV system user to submit lengthy technical documentation of the system's configuration. In some cases, the grid operator may compensate the PV system user for the electrical power delivered to the electrical grid, but in other cases, the PV system user may receive no compensation.

After a permit and interconnection request for a proposed PV system have been granted, the installation of the PV system begins. Several tasks in the installation process may be difficult for a typical lay person to perform, and if performed incorrectly, may damage the structural integrity of the residence and/or create a significant safety hazard. For example, during installation, a metallic rack for the PV panels is typically installed on the roof of the residence, and the PV panels are attached to the rack. If installed improperly, the metallic rack may damage the structural integrity of the roof or may cause the roof to leak. If not properly grounded, the metallic rack may pose an electrical safety hazard. As another example, simply carrying the PV panels to the roof may be difficult for many lay persons, because the panels are typically large (e.g., 1.6 m by 1 m) and heavy (e.g., 40 lb). As yet another example, the components of the PV system are wired together during installation. If wired improperly, the PV system may not deliver power to the premises and/or may create significant electrical safety hazards. For these reasons, many purchasers of residential PV systems hire skilled workers to install the systems. In some cases, a local regulatory entity may require that skilled workers perform the installation. Accordingly, for a typical residential PV system, the installation process may be performed by one or more skilled workers (e.g., electricians, building contractors) over a period of 10-20 or more labor hours, which may be spread over a period of weeks or months to allow for multiple inspections (e.g., on-site inspections) by local regulatory entities.

During installation and/or after the PV system is installed, a local regulatory entity may perform one or more on-site inspections to determine whether the PV system has been installed properly and is operating safely. In some jurisdictions, the local regulatory entity's inspection process may be quite onerous. For example, some local regulatory entities may require the PV system user to submit lengthy technical documentation of the PV system's installed configuration. Some local regulatory entities may charge a substantial permitting fee to cover the cost of the inspections. In some jurisdictions, the local regulatory entity's inspection process may be lengthy and/or may require unexpected or costly alterations to the PV system's configuration. The inventors have observed that the duration, inconvenience, expense, and inconsistency of the inspections may curb the market for residential PV systems and the prevalence of solar power generation by increasing the expense associated with installing a code-compliant PV system.

The inventors have developed devices and techniques which may be used to reduce the soft costs associated with purchasing and installing a PV system for a premises (e.g., a residential house). According to an aspect of the present disclosure, a "plug-and-play PV system" for a premises is provided. In some embodiments, the plug-and-play PV system may be installed on a premise, connected to the electrical grid, and commissioned for operation quickly, safely, and easily (e.g., by a lay person), and the plug-and-play PV system's compliance with applicable codes may be demonstrated quickly and easily.

In some embodiments, a plug-and-play PV system may be configured to eliminate potential safety hazards associated with conventional PV systems. Applicable codes may address such hazards in conventional PV systems by requiring one or more inspections (e.g., on-site inspections) to be performed and/or by requiring the PV system to be modified to mitigate the potential safety hazard. For example, applicable codes may require the metal racking of a conventional PV system to be electrically grounded, to mitigate the risk of electrocution. Connecting the metal racking to equipment ground and demonstrating that the metal racking is connected to equipment ground may be time-consuming and/or expensive. As another example, in a conventional PV system, the PV panels and the metal racking may be relatively heavy (e.g., heavier than a layer of asphalt shingles). Applicable codes may require a structural inspection of the structure on which the PV system is mounted, to determine whether the structure can safely support the weight of the PV system.

Eliminating potential safety hazards (e.g., the safety hazards described above) may reduce the costs of installation and/or permitting. In some embodiments, a plug-and-play PV system may use PV panels which adhere to the roof of a residential structure (e.g., by adhering to the roof sheathing or to a layer of shingles), thereby eliminating the metal racking, the safety hazards associated with the metal racking, and the components used in conventional PV systems to mitigate those hazards. In some embodiments, the panels may be mounted without forming penetrations into the roof. In some embodiments, the panels may include panels manufactured by Lumeta (e.g., the panels described in U.S. Pat. No. 7,531,740).

Applicable codes may not require a structural review when light-weight PV panels are used. Many building codes allow installation of a second layer of asphalt shingles on top of an existing layer of shingles without requiring a structural inspection, because the weight of the second layer of shingles is not considered a safety hazard. In some embodiments, a plug-and-play PV system may include lightweight PV panels which weigh no more than a layer of shingles (e.g., less than or equal to approximately two pounds per square foot). Accordingly, the installation (e.g., adhesive mounting) of such lightweight PV panels onto roof sheathing or onto a first layer of asphalt may not be a structural safety hazard, and applicable codes may not require a structural inspection when such panels are installed.

In some embodiments, a plug-and-play PV system may be configured to facilitate the system's installation. For example standardized cables and connectors may be used in some embodiments to facilitate proper and safe interconnection of the components of the PV system.

In some embodiments, a plug-and-play PV system may be configured to facilitate demonstration of compliance with applicable codes. For example, some embodiments of a plug-and-play PV system may be configured to obtain data describing the system. For example, a control device (also referred to herein as a "controller") of the plug-and-play PV system may be configured to probe the PV system, including by communicating with components of the PV system, to obtain data describing components of the system, the arrangement of the system's components, the system's operation, and/or the system's configuration, or other data describing the PV system. The obtained data may indicate a manner in which components are connected or a manner in which the PV system operates. In some such embodiments, this data may be used (e.g., by the PV system itself, by a local regulatory entity, by the PV system's user, by an operator of an electrical grid, and/or by any other suitable entity) to determine whether the PV system is compliant with applicable codes. For example, the plug-and-play PV system may include a control device which determines whether one or more PV system criteria are met by the PV system, including by using the data to determine whether the system complies with the criteria.

The PV system criteria may relate to preliminary authorization of the PV system. For example, the PV system control device may communicate with one or more devices outside the PV system and the premises at which the PV system is installed to determine whether the PV system was, before installation, authorized to be installed. As discussed below, during a design phase, a provider of PV systems may determine—through a process that may be manual, automatic, or a blend of both manual and automatic—whether a PV system may be installed at the premises and receive preliminary authorization for the PV system to be installed. Such a process may confirm that a PV system, or a particular proposed PV system (e.g., one with certain size or voltage parameters) would be, if installed properly at a premises, compliant with local zoning regulations, local historical district regulations, local building codes, or other regulations, and would be compatible with the electrical grid at the premises. The preliminary authorization may be in the form of a building permit from a local regulatory entity, as one specific example. Accordingly, during the process preliminary authorization(s) may be received from a local regulatory entity and/or an operator of an electrical grid. Information regarding the preliminary authorizations may be stored in a data store accessible to one or more computing devices, and the PV system control device may communicate with the computing device(s) to determine whether the PV system was preliminarily authorized.

The PV system criteria that may be evaluated by the PV system control device may include safety criteria that are applicable to PV systems and that, when met by a PV system, indicate that a PV system has been safely installed. Some such safety criteria may be commensurate with safety codes or other codes to which the PV system and/or the premises are subject. The safety codes may include electrical codes, such as the National Electric Code (NEC) or other applicable codes. The safety criteria may include criteria related to the components included in the system and compatibility of the components. Such criteria related to the components may include criteria related to whether the arrangement of components in an installed system matches a proposed arrangement of components for the system that was determined during a design phase, or criteria relating to whether physical connections between components are secure. The safety criteria may include criteria related to whether the PV system operating properly, including whether the system as a whole is operating properly, whether individual components are operating properly, and whether sets of two or more components are working properly in aggregate.

The PV system criteria may additionally or alternatively include local regulatory criteria that are applicable to the premises and/or to PV systems installed at the premises, such as local zoning or building codes. As another example, the plug-and-play PV system may include a control device which transmits the data and/or the control device's determinations regarding compliance with PV system criteria to a local regulatory entity. As another example, the plug-and-play PV system may generate a document describing the data and/or the control device's determinations regarding compliance with PV system criteria, and the document may be submitted (e.g., by the system's user) to a local regulatory entity. The local regulatory entity, including in one or more automated processes executing on one or more computing devices operated by the local regulatory entity, may use the information provided by the plug-and-play PV system to grant permits and/or to determine whether the system complies one or more PV system criteria. In some cases, the regulatory entity's use of the information provided by the plug-and-play PV system may streamline the permitting process, reduce the number of inspections, decrease the duration, invasiveness, and/or expense of the inspections, and/or eliminate the on-site inspections completely. In other words, some embodiments of the plug-and-play PV system may automate at least some portions of the permitting and/or inspection processes.

The PV system criteria may additionally or alternatively include electrical grid criteria that are applicable to the premises and/or to PV systems installed at the premises. The electrical grid criteria may relate to compatibility between the PV system and the electrical grid of the premises, such as compatibility of components, operating ranges for voltage, current, or other power parameters, or whether the electrical grid can support increased load and/or power that may accompany the connection of the PV system to the electrical grid. The electrical grid criteria may also relate to whether the operator is willing to reimburse an owner of the premises and/or of the PV system for power provided to the electrical grid from the PV system. In some embodiments, the plug-and-play PV system may be configured to facilitate the system's interconnection to the electrical grid. For example, some embodiments of the plug-and-play PV system may include a control device configured to send data to an electrical grid's operator, which may use the data, including in one or more automated processes executing on one or more computing device operated by the operator, to determine whether PV system criteria are met and whether to grant or deny a request to connect to the system to the grid. The operator, or the computing device of the operator, may convey the determination to the PV system controller, which may respond to the determination by either permitting the connection to be made to the electrical grid or not. In some embodiments, the plug-and-play PV system may automate at least some steps of the grid interconnection process.

In some embodiments, once the PV controller (and/or other entities) determines that the PV system complies with the PV system criteria, the PV controller may energize the PV system and may additionally permit a connection to be made between the PV system and the electrical grid. In some embodiments, the PV system controller may be configured, or may configure the PV system, not to permit a connection to be made between the PV system and the electrical grid until it has been determined that the PV system criteria are met. For example, the PV controller may control a locking mechanism that mechanically prevents a physical connection to be made between the PV system and the electrical grid. The PV controller, during installation of the PV system and while determining whether the PV system criteria are met, may operate the locking mechanism or other tool to prevent a connection. Once the PV system controller determines that the PV system criteria are met, the PV system controller may configure the PV system to permit the connection, such as by controlling the locking mechanism or other tool to enable a physical connection. In some embodiments, the PV system may require a physical input from a user to connect or disconnect the system, such as a push of a physical button or movement of a physical lever. In some embodiments, such a physical button or lever may, through a mechanism, cause a physical and electrical connection between a connector of the PV system and a connector of the electrical grid. In some embodiments, the locking mechanism or other tool may interact with the physical button or lever to prevent operation of the button/lever before the PV controller determines that the PV system criteria are met. It should be appreciated that embodiments are not limited to using such a physical input from a user to cause a connection between the PV system and the electrical grid.

In some embodiments, a plug-and-play PV system may be configured to detect fault conditions (e.g., failure or improper configuration of one or more components within the PV system) during the installation process, during a commissioning process, during the system's operation, and/or at any other suitable time. The PV system may output information indicating the existence of these fault conditions and may, in some embodiments, additionally output a diagnosis of the fault condition. The output from the PV system may be in any suitable manner, including to a user interface of a device operated by an owner of the PV system and/or of the premises, or to an installer of the PV system.

The inventors have additionally recognized and appreciated the advantages of a plug-and-play style of photovoltaic system that includes interconnecting cable assemblies that are able to monitor and manage the photovoltaic system, including photovoltaic panels of the system. The inventors have recognized and appreciated that integrating monitoring and management functionality with each individual panel may significantly increase the cost of purchasing and servicing the panels, and implementing the functionality as standalone devices connected to each of the panels may significantly increase the complexity of installation and servicing of a photovoltaic system. The inventors have recognized and appreciated, however, that integrating such control circuits and functionality into a cable assembly, interconnected with the panels and a DC network via a limited set of removably coupled connectors, may be advantageous in embodiments. Such a cable assembly may permit the monitoring and management functionality to be included in photovoltaic systems while increasing the ease of installation and servicing of the systems.

In some embodiments, a "smart cable" may interconnect a set of photovoltaic panels and a DC network of a photovoltaic system. In addition to delivering power produced by the panels to the DC network via a power bus, the cable assembly may include control circuits corresponding to each of the photovoltaic panels of the set, or to two or more panels of the set. The control circuits may be distributed along a length of the cable assembly and integrated with the cable assembly, and connected via a single connector (or, in some embodiments, via multiple connectors). The control circuits may include circuitry to monitor a performance of a panel and convey that information to a central, premises photovoltaic system controller and, in response to an instruction from that controller, operate one or more switches to add or remove the panel from set. The control circuits may additionally include circuitry to identify a panel and/or identify whether the panel is properly connected to the cable assembly, and convey that information to the premises photovoltaic system controller.

The aspects and embodiments described above, as well as additional aspects and embodiments, are described further below. These aspects and/or embodiments may be used individually, all together, or in any combination, as the application is not limited in this respect.

FIG. 1 shows a premises photovoltaic (PV) system 101, according to some embodiments. In some embodiments, premises PV system 101 may include a set of photovoltaic and electrical components for converting sunlight to electrical power (e.g., alternating current ("AC") power) and delivering the power to an electrical system 108 of a premises and/or to an electrical grid 110.

In some embodiments, premises PV system 101 may be electrically coupled to a premises electrical system 108, which may comprise an electrical system for a premises (e.g., a residential building, house, apartment, commercial building, and/or any other suitable structure or portion thereof). Premises electrical system 108 may include a circuit breaker box ("breaker box," "fuse box," "AC mains panel," or "AC distribution panel") configured to receive AC power delivered by premises PV system 101 and/or AC power delivered by electrical grid 110.

In some embodiments, premises PV system 101 may be electrically coupled to electrical grid 110. Electrical grid 110 may comprise a system for generating electrical power and managing delivery of the electrical power to premises electrical system 108, or any suitable portion of such a system. Electrical grid 110 may be configured to receive electrical power (e.g. AC electrical power) generated by premises PV system 101. In some embodiments, electrical grid 110 or premises PV system 101 may include an electrical meter for metering power provided to premises electrical system 108 by electrical grid 110 and/or for metering power provided to electrical grid 110 by premises PV system 101. In some embodiments, PV system 101 may be electrically coupled to electrical grid 110 through a grid interconnection device for making and/or breaking an electrical connection between premises PV system 101 and electrical grid 110. In some embodiments, the grid interconnection device may be coupled to or integrated with the electrical meter.

In some embodiments, premises PV system 101 may be configured to communicate with an operator 122 of the premises, an operator 124 of the electrical grid, and/or a regulatory entity 126. In some embodiments, premises PV system 101 may be configured to communicate with the premises operator through a computing device associated with the premises operator. The premises operator may include, without limitation, an owner of the premises, a resident of the premises, a user of the premises, an employee or owner of a business operated on the premises, and/or any other suitable entity. In some embodiments, premises PV system 101 may be configured to communicate with grid operator 124 through a computing device associated with the grid operator. The grid operator may include, without limitation, an entity (e.g., a utility company) that operates at least a portion of electrical grid 110 (e.g., the portion of electrical grid 110 that provides power to premises electrical system 108 and/or receives power from premises PV system 101). In some embodiments, premises PV system 101 may be configured to communicate with local regulatory entity 126 through a computing device associated with the local regulatory entity. The local regulatory entity may be an authority having jurisdiction over the premises, such as a person, agency, or department of a municipality, county, state, military base, and/or other political division or geographic area where the premises are located. The local regulatory entity may include, without limitation, an entity that has regulatory authority over premises PV systems, an entity that is authorized to grant permits for installation of premises PV systems 101, and/or an entity that is authorized to inspect premises PV systems 101.

In some embodiments, premises PV system 101 may include a DC network 102, an inversion system 104, an AC network 106, and premises PV system controller 120. In some embodiments, DC network 102 may include a network of electrical and photovoltaic components for converting sunlight into DC power and managing delivery of the DC power to an inversion system. In some embodiments, DC network 102 may provide one or more DC power signals to inversion system 104 through an electrical connection 130. In some embodiments, DC network 102 may be configured to communicate with premises PV system controller 120. Embodiments of DC network 102 are described in further detail below with reference to FIG. 2.

In some embodiments, premises PV system 101 may include an inversion system 104. In some embodiments, inversion system 104 may be configured to receive DC power signals from DC network 102 through electrical connection 130. In some embodiments, inversion system 104 may include one or more components for converting DC power into AC power. In some embodiments, inversion system 104 may provide one or more AC power signals to AC network 106 via electrical connection 132. In some embodiments, inversion system 104 may be configured to communicate with premises PV system controller 120. Embodiments of inversion system 104 are described in further detail below with reference to FIG. 2.

In some embodiments, premises PV system 101 may include an AC network 106. In some embodiments, AC network 106 may be configured to receive one or more AC power signals from inversion system 104 through electrical connection 132. In some embodiments, AC network 106 may include a network of electrical components for managing delivery of AC power to a premises electrical system 108 and/or to an electrical grid 110. In some embodiments, AC network 106 may include an electrical meter for metering power provided to premises electrical system 108 by electrical grid 110 and/or for metering power provided to electrical grid 110 by premises PV system 101. In some embodiments, PV system 101 may be electrically coupled to electrical grid 110 through a grid interconnection device for making and/or breaking an electrical connection between electrical grid 110 and premises PV system 101. In some embodiments, the grid interconnection device may be coupled to or integrated with the electrical meter. In some embodiments, AC network 106 may be configured to communicate with premises PV system controller 120. Embodiments of AC network 106 are described in further detail below with reference to FIG. 2.

In some embodiments, premises PV system may include a system controller 120. In some embodiments, system controller 120 may be configured to communicate with DC network 102, inversion system 104, and/or AC network 106. In some embodiments, system controller 120 may communicate with components of premises PV system 101 using any suitable communication technique (e.g., power-line communication, wireless communication, wired communication, the Internet, and/or a dedicated communication infrastructure). In some embodiments, system controller 120 may be configured to control operation of premises PV system 101, including by controlling operation of DC network 102, inversion system 104, and/or AC network 106. In some embodiments, controlling operation of premises PV system 101 may comprise changing the configuration of a component of the PV system, activating and/or deactivating a component of the PV system, and/or any other suitable act which controls the operation of premises PV system 101 or any portion thereof.

In some embodiments, system controller 120 may be configured to obtain data associated with premises PV system 101 and/or components thereof. In some embodiments, the data may include signal data characterizing electrical signals in premises PV system 101, including, without limitation, data indicating the power, voltage, current, frequency, and/or any other suitable attribute of electrical signals in the PV system. In some embodiments, the data may include component data characterizing the operation of one or more components of premises PV system 101, including, without limitation, data indicating a status, an efficiency, and/or any other suitable attribute of a PV system component. In some embodiments, the data may include identification data identifying one or more components of premises PV system 101. In some embodiments, the data may include arrangement data indicating the manner in which components of premises PV system 101 are arranged. Data indicating an arrangement of devices may include, for example, data indicating the topology of an electrical network formed by the components.

In some embodiments, system controller 120 may be configured to commission premises PV system 101. As part of commissioning the PV system, the controller 120 may determine whether the system's installation and/or operation complies with applicable codes, regulations, or other criteria relating to a PV system. Such criteria may include criteria relating to safety, zoning, authorization, or other factors. The criteria may be included in standardized codes like electrical codes, including the National Electric Code (NEC). Examples of ways in which the system controller 120 may be configured to commission the PV system 101 are discussed below in connection with FIGS. 3A-3D.

In some embodiments, system controller 120 may be configured to communicate with premises operator 122. For example, the controller 120 may send data and/or messages associated with the system to premises operator 122, and/or to receive instructions regarding the operation of the system from premises operator 122. In some embodiments, system controller 120 may be configured to communicate with grid operator 124. The controller 120 may communicate with the operator 124 to send data and/or messages associated with the system to grid operator 124, to request connection of premises PV system 101 to electrical grid 110, to receive authorization from grid operator 124 to make (or break) a connection between PV system 101 and electrical grid 110, and/or to receive instructions from grid operator 124 to activate, deactivate, and/or reconfigure one or more components of PV system 101. In some embodiments, system controller 120 may be configured to communicate with local regulatory entity 126, such as to apply for a permit to install and/or operate premises PV system 101, to register premises PV system 101, to send data relevant to the permitting process, to receive data associated with the permitting process, and/or to receive instructions from regulatory entity 126 to active and/or deactivate PV system 101. In some embodiments, system controller 120 may communicate with premises operator 122, grid operator 124, and/or local regulatory entity 126 using any suitable communication technique or network, including, without limitation, the Internet and/or an Advance Metering Infrastructure (AMI) network.

In some embodiments, system controller 120 may communicate with premises operator 122, grid operator 124, and/or local regulatory entity 126 through one or more intermediate servers. In some embodiments, the intermediate server(s) may be configured to manage communication between premises PV systems and grid operators, and/or to manage communication between premises PV systems and local regulatory entities. The policies and procedures of grid operators and local regulatory entities regarding communication with PV system controllers may vary greatly among different jurisdictions, grid operators, and/or local regulatory entities. For example, different regulatory entities in different jurisdictions may require that electronic requests for permits include different sets of data. As another example, some regulatory entities may process and grant permit requests in real-time, and some other regulatory entities may treat electronic requests for permits as notifications to initiate in-person, on-site inspections. In some embodiments, the intermediate server(s) may shield system controller 120 from the complexity of the varying policies and procedures of the different grid operators, regulatory entities, and/or jurisdictions by presenting a uniform interface to system controller 120. Upon receipt of data from a controller 120 for a premises, the intermediate server may determine what data to communicate and a format in which to communicate the data to grid operators and/or local regulatory entities for the premises. In some cases, the intermediate server may additionally determine which grid operator(s) and/or local regulatory entities have authority over the premises, such as by evaluating a location of the premises and locations over which various operators and/or regulatory entities have jurisdiction. Once the data, the format, and the destination(s) are determined, the intermediate servers may communicate data regarding a PV system, including data that was obtained by the PV system controller 120 and communicated to the intermediate server, to the destination(s) in the format.

In some embodiments, system controller 120 may store a premises PV system identifier. In some embodiments, system controller 120 may comprise a circuit configured to generate a premises PV system identifier. In some embodiments, the premises PV system identifier may be used to identify the premises PV system in a database or registry of PV systems. In some embodiments, such a database may be maintained in an off-premises server, such as one of the intermediate servers discussed above, for the convenience of entities seeking information about a PV system (e.g., for the convenience of grid operators, regulatory entities, PV system providers, PV system installers, PV system users, etc.).

In some embodiments, system controller 120 may communicate with one or more servers (e.g., the intermediate server(s) described above and/or other server(s)) to retrieve information regarding PV systems and/or components of PV systems. In some embodiments, system controller 120 may send the server(s) data identifying a PV system (e.g., a PV system identifier or any other suitable identifying information) and/or components of the PV system (e.g., component serial numbers, component model numbers, and/or any other suitable identifying information). In response, the server(s) may send to system controller 120 data describing the identified PV system (e.g., the PV system specification and/or any other suitable information describing the PV system) and/or the identified components (e.g., ratings, specifications, and/or any other suitable information describing the components).

Figure 2:
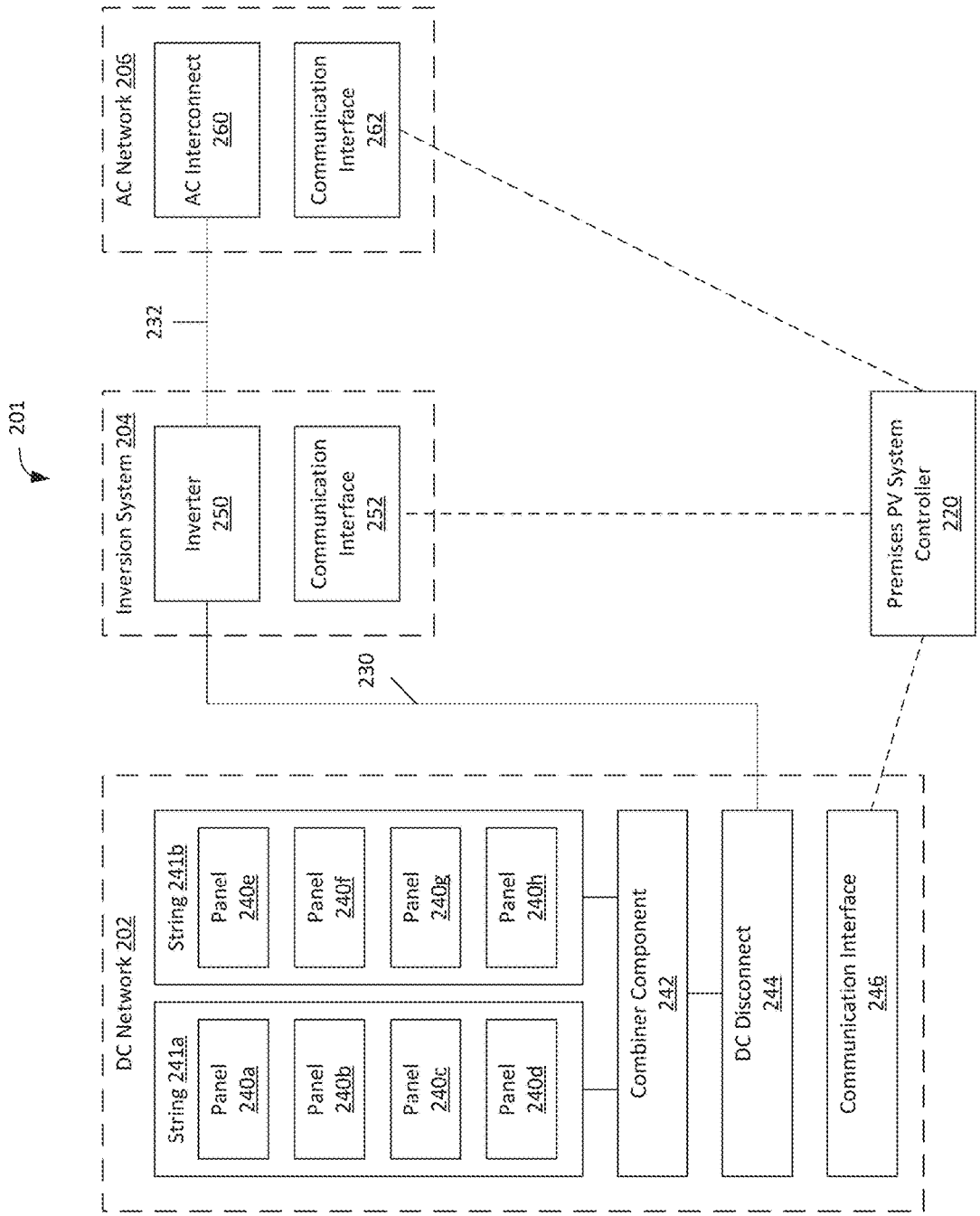
FIG. 2 is a block diagram illustrating components of a premises PV system, according to some embodiments.

FIG. 2 shows components of a premises PV system 201, according to some embodiments. In some embodiments, premises PV system 201 includes a DC network 202, an inversion system 204, an AC network 206, and a premises PV system controller 220.

In some embodiments, DC network 202 includes a network of electrical and photovoltaic components for converting sunlight into DC power and managing delivery of the DC power to an inversion system. In some embodiments, the components of DC network 202 may include one or more PV panels 240 for converting sunlight into DC power. In some embodiments, a PV panel may have one or more terminals (e.g., a positive power terminal, a negative power terminal, and/or a communication terminal). In some embodiments, the terminals may be disposed in or coupled to one or more adapters (e.g., one or more plugs and/or receptacles). In some embodiments, the components of DC network 202 may include cables and/or interconnection circuitry (241, 242, 244) for combining the DC power signals generated by multiple PV panels into a combined DC power signal and delivering the combined DC power signal to inversion system 204.

In the example of FIG. 2, DC network 202 includes eight PV panels 240a-240h, with panels 240a-d being organized in a string 241a, and with panels 240e-h being organized in a string 241b. In some embodiments, a string 241 may include two or more series-connected PV panels. In some embodiments, the panels in a string may be series-connected using a smart cable harness, as described in further detail below. Although the example of FIG. 2 illustrates eight panels organized in two strings of four panels, a DC network may, in some embodiments, include any suitable number of panels arranged in any suitable configuration (e.g., a single panel, a single string of two or more panels, two or more strings of panels, etc.).

In some embodiments, DC network 202 may include one or more combiner components 242. In some embodiments, a combiner component may combine the power signals provided by multiple PV panels, strings, and/or other combiner components to generate a combined power signal. In the example of FIG. 2, combiner component 242 combines the power signals provided by strings 241a and 241b. In some embodiments, a DC network 202 may include no combiner components or any suitable number of combiner components arranged in any suitable configuration.

In some embodiments, DC network 202 may include a DC disconnect device ("DC disconnect") 244. In some embodiments, DC disconnect 244 may be configured to controllably make and/or break a connection between (1) DC network 202 and (2) inversion system 204, AC network 206, a premises electrical system, and/or an electrical grid. In some embodiments, DC disconnect 244 may comprise a manually operated (e.g., mechanical) switch. In some embodiments, DC disconnect 244 may comprise an electronically operated (e.g., remotely controlled) switch. In some embodiments, DC disconnect 244 may use any suitable components to make and/or break an electrical connection (e.g., a fuse, a circuit breaker, a ground fault interrupter, etc.).

In some embodiments, DC network 202 may include a communication interface 246. In some embodiments, communication interface 246 may be integrated in whole or in part into other components of DC network 202. In some embodiments, communication interface 246 may be communicatively coupled to system controller 220. In some embodiments, communication interface 246 may receive requests for data from system controller 220, and may respond to such requests. In some embodiments, communication interface 246 may receive instructions from system controller 220. In some embodiments, communication interface 246 may relay those instructions to suitable components of DC network 202, and/or may perform the instructed task (e.g., activating a component of DC network 202, deactivating a component of DC network 202, obtaining requested data from a component of DC network 202, etc.).

FIG. 2 illustrates just one example of a DC network 202. In some embodiments, a DC network 202 may include any suitable arrangement of panels and/or circuitry for managing delivery of DC power to an inversion system. In some embodiments, a DC network may include any suitable device(s) for communicating with premises PV system controller 220.

Inversion system 204 may be configured to convert DC electricity into AC electricity of any suitable voltage (e.g., 240V, 208V 3-phase) and/or frequency (e.g., 60 Hz). In some embodiments, inversion system 204 may include one or more DC/AC inverters 250. In some embodiments, an inverter 250 may be configured to receive DC power signals from DC network 202 via one or more connectors 230, to convert the DC power signals into AC power signals, and to provide the AC power signals to AC network 206 via one or more connectors 232. An inverter 250 may be implemented using any suitable arrangement of any suitable components.

In the example of FIG. 2, inversion system 204 includes a single inverter 250. In some embodiments, an inversion system 204 may include any suitable number of inverters. In some embodiments, inversion system 204 may include one or more central inverters and/or one or more micro-inverters. In embodiments where inversion system 204 includes multiple inverters (e.g., multiple micro-inverters), the outputs of the inverters may be combined using any suitable technique (e.g., by arranging the outputs of the inverters in parallel through a junction box or any other suitable AC combiner component). In some embodiments, a central inverter may be configured to receive DC power signals generated by a relatively large number of panels (e.g., a relatively long string of panels or multiple strings of panels). In some embodiments, a micro-inverter may be configured to receive DC power signals generated by a relatively small number of panels (e.g., one panel or a short string of panels). In some embodiments, a micro-inverter may comprise an AC Module and/or may be integrated with a PV panel.

In some embodiments, inversion system 204 may include a communication interface 252. In some embodiments, communication interface 252 may be integrated in whole or in part into one or more other components of inversion system 204. In some embodiments, communication interface 252 may be communicatively coupled to system controller 220. In some embodiments, communication interface 252 may receive requests for data from system controller 220, and may respond to such requests. In some embodiments, communication interface 252 may receive instructions from system controller 220. In some embodiments, communication interface 252 may relay those instructions to one or more inverters 250, and/or may perform the instructed task (e.g., activating one or more inverters 250, deactivating one or more inverters 250, obtaining requested data from one or more inverters 250, etc.).

AC network 206 may be configured to manage delivery of AC power to a premises electrical system and/or to an electrical grid. In some embodiments, AC network 206 may include an AC interconnection device ("AC interconnect") 260. In some embodiments, AC interconnect 260 may be configured to controllably make and/or break a connection between (1) AC network 206 and (2) a premises electrical system and/or an electrical grid. In some embodiments, AC interconnect 260 may comprise a manually operated (e.g., mechanical) switch. In some embodiments, AC interconnect 260 may comprise an electronically operated (e.g., remotely controlled) switch. In some embodiments, AC interconnect 260 may use any suitable components to make and/or break an electrical connection (e.g., an AC Disconnect, one or more fuses, circuit breakers, switches, and/or any other suitable components).

In some embodiments, AC interconnect 260 may provide over current protection. The over current protection may be provided using any suitable techniques and/or components, including, without limitation, one or more ground-fault interrupter devices.

In some embodiments, AC interconnect 260 may include an adapter for connecting AC network 206 to other components of the PV system (e.g., to inversion system 204). In some embodiments, the adapter may include one or more plugs and/or receptacles suitable for mating to a corresponding adapter included in another portion of the PV system (e.g., in inversion system 204). In some embodiments, an electrical coupling between AC interconnect 260 and other components of the PV system may be formed by mating the adapter of AC interconnect 260 with the adapter included in the other portion of the PV system. In some embodiments, AC interconnect 260 may lock the mated adapters together in response to a command from system controller 220.

In some embodiments, AC interconnect 260 may include an adapter for connecting AC network 206 to a premises electrical system. In some embodiments, the adapter may include one or more plugs and/or receptacles suitable for mating to a corresponding adapter included in the premises electrical system (e.g., an adapter integrated in or coupled to the premises electrical system's AC distribution panel). In some embodiments, an electrical coupling between premises PV system 201 and the premises electrical system may be formed by mating the adapter of AC interconnect 260 with the adapter of the premises electrical system. In some embodiments, AC interconnect 260 may lock the mated adapters together in response to a command from system controller 220.

In some embodiments, AC interconnect 260 may include an adapter for connecting AC network 206 to an electrical grid. In some embodiments, the adapter may include one or more plugs and/or receptacles suitable for mating to a corresponding adapter coupled to the electrical grid (e.g., an adapter integrated with or coupled to the grid interconnection device). In some embodiments, an electrical coupling between premises PV system 201 and the electrical grid may be formed by mating the adapter of AC interconnect 260 with the adapter of the grid interconnection device. In some embodiments, AC interconnect 260 may lock the mated adapters together in response to a command from system controller 220 and/or in response to a command from the grid's operator.

In some embodiments, AC network 206 may include a communication interface 262. In some embodiments, communication interface 262 may be integrated in whole or in part into other components of AC network 206. In some embodiments, communication interface 262 may be communicatively coupled to system controller 220. In some embodiments, communication interface 262 may receive requests for data from system controller 220, and may respond to such requests. In some embodiments, communication interface 262 may receive instructions from system controller 220. In some embodiments, communication interface 262 may relay those instructions to AC disconnect 260, and/or may perform the instructed task (e.g., activating AC disconnect 260, deactivating AC disconnect 260, obtaining requested data from AC disconnect 260, etc.).

In some embodiments, premises PV system 201 may include one or more devices for storing electrical charge (e.g., batteries) (not shown). In some embodiments, PV system 201 may include a charge controller (not shown) for controlling the charging and discharging of the charge-storage device(s). In some embodiments, the charge controller may be configured to charge the charge-storage device(s) when the system's panels produce more electrical power than the premises electrical system demands. In some embodiments, the charge controller may be configured to discharge the charge-storage device(s) when the system's panels produce less electrical power than the premises electrical system demands. In some embodiments, charge-storage device(s) may be added to the PV system to import electrical power into the system, and/or removed from the PV system to export electrical power to other premises.

According to an aspect of the present disclosure, premises PV system 201 may include a premises PV system controller 220 configured to commission the PV system. In some embodiments, the commissioning process may include a system identification process and/or a system validation process.

In some embodiments, the system identification process may include any suitable acts for identifying the components of PV system 201 and/or the arrangement of the system's components. In some embodiments, during the system identification process, data indicative of some or all of the following information may be obtained by system controller 220:

(1) serial numbers, model numbers, safety ratings (e.g., voltage ratings, current ratings, power ratings, etc.), and/or any other information describing or identifying components of PV system 201 (e.g., panels, strings, combiner components, DC disconnects, inverters, central inverters, micro-inverters, AC disconnects, a grid interconnection device, cables, and/or any other suitable components);

(2) the number of components in PV system 201 (e.g., the number of PV panels, strings, combiner components, DC disconnects, inverters, AC disconnects, cables, and/or any other suitable components);

(3) the types (e.g., "makes" and/or "models") of components in PV system 201 (e.g., the types of PV panels, strings, combiner components, DC disconnects, inverters, AC disconnects, cables, and/or any other suitable components);

(4) the arrangement of the PV system's components (e.g., the topology of electrical couplings between the components, the number of PV panels in a string, the positions and/or identifiers of individual panels in a string, the number of inputs to a combiner component, the positions and/or identifiers of inputs (e.g., panels, strings, and/or other combiner components) to a combiner component; and/or (5) any other suitable information describing and/or identifying components of PV system 201.

In some embodiments, the above-described system identification data may be obtained using any suitable technique, including, but not limited to, (1) querying a component through a corresponding communication interface and receiving, in response to the query, the component's identification data, and/or (2) testing a component to determine the component's electrical attributes and identifying the component based on the determined electrical attributes. For example, the type of cable used to connect two components may be determined, in some embodiments, by measuring the impedance of the cable at one or more frequencies and by comparing the measured values to expected values for various cables. As another example, a dedicated identification circuit may be integrated with the cable, and the type of cable may be determined, in some embodiments, by measuring an electrical characteristic (e.g., impedance) of the dedicated ID circuit.

In some embodiments, the system validation process may include any acts suitable for determining whether PV system 201 complies with the at least one PV system criterion. In some embodiments, during the system validation process, one or more tests may be performed to determine (1) whether individual components comply with PV system criteria, (2) whether strings of PV panels comply with PV system criteria, (3) whether connections or couplings between components comply with PV system criteria, and/or (4) whether sets of components (including, but not limited to, the entire set of components forming the PV system) comply with PV system criteria.

In some embodiments, tests may be performed on individual components of PV system 201 to determine whether the individual components comply with PV system criteria.

In some embodiments, suitable tests may include, but are not limited to, the following tests:
(1) A test to determine whether a component's type is approved or unapproved. In some embodiments, such a test may be performed by determining a component's type and comparing the determined type to a set of types approved for use in PV systems by the appropriate regulatory entity.
(2) A test to determine whether a component is rated for the conditions the component may experience in the PV system. In some embodiments, such a test may be performed by identifying the component or determining the component's type, using the component's identifying information or type to determine the component's ratings (e.g., by querying a database of component data for rating information corresponding to the component), and comparing the component's ratings (e.g., current rating, voltage rating, power rating, and/or any other suitable rating) to the conditions the component may experience in the PV system.
(3) A test to determine whether a component possesses a specified feature. In some embodiments, such a test may be performed by identifying the component or determining the component's type, and using the component's identifying information or type to determine the component's features (e.g., by querying a database of component data for features of the component).
(4) A test of an isolated PV panel. In some embodiments, such a test may comprise selectively energizing the panel, such as in isolation (e.g., with or without energizing other panels), measuring the panel's output voltage, and comparing the panel's output voltage to an expected value. In some embodiments, such a test may comprise performing a voltage-current sweep of the isolated PV panel. In some embodiments, such tests may be performed for each of multiple PV panels in isolation, as well as for groups of panels (e.g., all panels in a string, or all panels of the PV system, or any other combination of panels).
(5) A suitable test to determine whether a component is grounded.
(6) A suitable test to determine whether a component is installed correctly, or is installed incorrectly or is damaged. In some embodiments, such a test may comprise a test to detect conductors with damaged conductor insulation. In some embodiments, a test to detect damaged conductor insulation may comprise applying a high-frequency test signal to the conductor.
(7) Any suitable test to determine whether current, voltage, and/or power limits of a component are exceeded when the PV system (or a portion of the PV system) is energized. In some embodiments, the current, voltage, and/or power limits for the component may be specified by a regulatory entity and/or by the component's manufacturer.
(8) A test to determine whether a component reports that it is operating properly.
(9) Any other suitable test.

In some embodiments, tests may be performed on strings of PV panels to determine whether the strings comply with PV system criteria. In some embodiments, suitable tests may include, but are not limited to, the following tests:
(1) A test to determine whether the number of panels connected in series in a string is greater than a maximum limit or less than a minimum limit.
(2) A test to determine whether the sizes of two or more strings are mismatched. In some embodiments, the sizes of two strings may be mismatched if the number of panels in the first string differs from the number of panels in the second string by more than a specified number of panels.
(3) A test to determine whether the output voltage of a string exceeds the maximum output voltage for a string. In some embodiments, the actual output voltage of a string may be measured and compared to a maximum string voltage. In some embodiments, the output voltage of a string may be determined based on the number of panels in the string, and compared to a maximum string voltage.
(4) Any other suitable test.

In some embodiments, tests may be performed on connections between or among components of PV system 201 to determine whether the connections comply with PV system criteria. In some embodiments, suitable tests may include, but are not limited to, the following tests:
(1) A test to determine whether the ratings of components on opposite sides of a connection point match or are compatible. In some embodiments, such a test may comprise comparing the ratings (e.g., voltage, current, and/or power ratings) of components at a connection point to determine whether a signal provided by a first component to a second component at the connection point may exceed the second component's ratings.
(2) A test to determine whether adapters used to form connections between components are properly terminated and seated. In some embodiments, such a test may comprise determining the status of a last-make, first-break pin of an adapter used to form the connection. In some embodiments, such a test may comprise determining whether components connected downstream from the connection point are functioning properly.
(3) Any other suitable test.

In some embodiments, tests may be performed on a set of components (including, but not limited to, the entire set of components forming the PV system) to determine whether the set of components complies with PV system criteria. In some embodiments, suitable tests may include, but are not limited to, the following tests:
(1) A test to determine whether the components are arranged in an approved configuration. In some embodiments, such a test may comprise comparing the arrangement of the set of components (e.g., the arrangement of components in PV system 201) to one or more approved PV system specifications, such as a system specification that had been specifically proposed for the PV system. In some embodiments, an approved PV system specification may be generated by the designer of the PV system, by a regulatory entity, and/or by any other suitable entity. In some embodiments, the approved PV system specification(s) may include a customized specification corresponding to PV system 201. In some embodiments, the approved PV system specification(s) may include one or more standard specifications. In some embodiments, the approved PV system specification(s) may be stored on system controller 220, on an intermediate server communicatively coupled to system controller 220, and/or in any other suitable location.
(2) A test to determine whether one or more components of the PV system are properly grounded. For example, a test may be performed to determine whether compliance with PV system criteria requires a particular component to be grounded, and/or a test to determine whether a particular component includes a grounding conductor.

(3) A test to determine whether the voltages, currents, and power levels provided to inversion system 204 and provided by inversion system 204 are within specified ranges.

(4) A test to determine whether the voltage and frequency of electricity received from the utility grid are within specified ranges.

(5) A test to determine whether the voltage, currents, power levels, and frequencies of electrical signals provided to AC network 206 and/or provided by AC network 206 are within specified ranges.

(6) A test to determine whether any DC voltage is present in DC network 202 when all panels 240 are deactivated.

(7) Any other suitable test.

In cases where PV system 201 is successfully commissioned, system controller 220 may, in some embodiments, activate PV system 201 and/or send a message to a user of PV system 201 indicating that the system is commissioned and ready for operation. In some embodiments, system controller 220 may not permit the activated PV system 201 to be connected to a premises electrical system or to an electrical grid until the system is successfully commissioned.

In cases where system controller 220 is not successfully commissioned, system controller 220 may, in some embodiments, (1) display a warning or send a warning message to a user of the PV system and/or to a regulatory entity, (2) hobble the PV system (e.g., de-energize the portion of the system that failed to satisfy a PV system criterion, but activate other portions of the system), and/or (3) deactivate the system.

In some embodiments, PV system controller 220 may be configured to facilitate permitting and/or inspection of the PV system. For example, the system controller may, in some embodiments, send at least a portion of the data obtained during the commissioning process to the appropriate regulatory entity. In some embodiments, the system controller may generate a document including at least a portion of the data obtained during the commissioning process, and a user of the PV system may submit the document to the appropriate regulatory entity. As discussed above, to submit the document to the regulatory entity (including to determine the appropriate entity), the controller 220 may communicate data about the PV system to an intermediate server, which may select which data to communicate to a regulatory entity and/or a format in which to communicate that data.

In some embodiments, PV system controller 220 may be configured to facilitate connection of the PV system to an electrical grid. For example, the system controller may, in some embodiments, send at least a portion of the data obtained during the commissioning process to the grid's operator. In some embodiments, the system controller may generate a document including at least a portion of the data obtained during the commissioning process, and a user of the PV system may submit the document to the grid's operator. In some embodiments, the system controller may send power generation information to the grid's operator, including, without limitation, the PV system's power rating (e.g., power generation capacity), the PV system's address (e.g., the address of the premises on which the PV system is located and/or to which the PV system provides electrical power), an account number corresponding to a customer of the electrical grid at the PV system's address, information describing the PV system's inversion system (e.g., the make(s) and model(s) of the system's inverter(s)), and/or data which the grid operator may use to remotely control (e.g., deactivate) one or more components of the PV system (e.g., the grid interconnection device). Such data may include, in some embodiments, data required by California's Rule 21.

In some embodiments, AC network 206 may include an adapter (e.g., a plug and/or receptacle) for connecting the PV system to a grid interconnection device suitable for connecting the PV system to the electrical grid. In some embodiments, the grid interconnection device may be provided by the grid operator. In some embodiments, the grid interconnection device may be integrated with or included in AC network 206, integrated with the electrical meter, attached to the electrical meter, and/or electrically coupled to the electrical meter. In some embodiments, the grid interconnection device may comprise a meter collar attached to the electrical meter. In some embodiments, the grid interconnection device may be located adjacent to the electrical meter and electrically coupled to the electrical meter. In some embodiments, the grid interconnection device may include an adapter (e.g., a receptacle and/or a plug) suitable for connecting to a corresponding adapter of the AC network. In some embodiments, the grid operator may send commands to the grid interconnection device to make or break a connection between the PV system and the electrical grid (e.g., in response to receiving data from system controller 220 indicating that the commissioning of the PV system succeeded or failed).

In some embodiments, after PV system has been commissioned and activated, system controller 220 may monitor the PV system's operation for faults. In some embodiments, the system controller may monitor the PV system for faults by periodically or intermittently performing some or all of the tests performed during commissioning. In cases where a fault is detected, the system controller may, in some embodiments, (1) display a warning or send a warning message to a user of the PV system and/or to a regulatory entity, (2) hobble the PV system (e.g., de-energize the portion of the system that failed to satisfy a PV system criterion, but activate other portions of the system), and/or (3) deactivate the system.

Figure 3A:
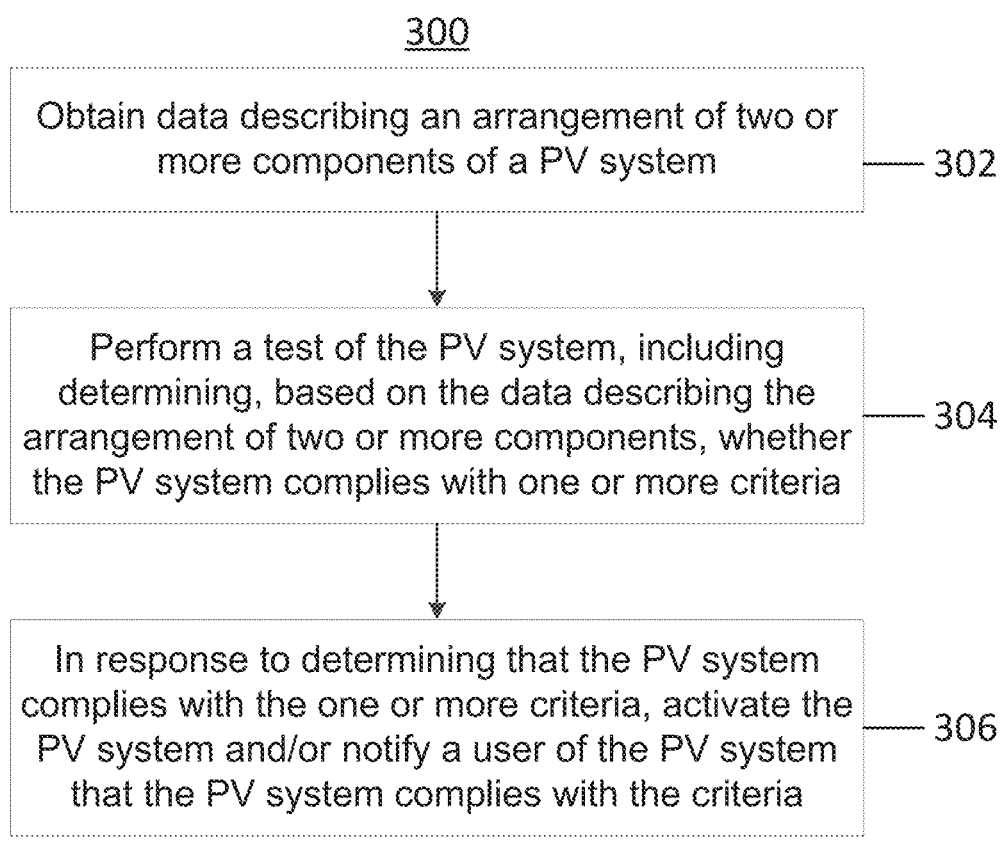
FIG. 3A is a flowchart of a method for commissioning a premises PV system, according to some embodiments.

FIG. 3A shows a method 300 for commissioning a premises PV system, according to some embodiments. In some embodiments, method 300 may be performed by a system controller 220. In step 302, data describing an arrangement of two or more components of the PV system is obtained. In some embodiments, obtaining the data describing the arrangement of the two or more components of the PV system may comprise receiving data identifying the two or more components of the PV system. In some embodiments, obtaining the data describing the arrangement of the two or more components of the PV system may comprise obtaining data describing a topology of electrical connections among the two or more components of the PV system.

In step 304, a test of the PV system is performed. Performing the test may include determining whether the PV system complies with at least one PV system criterion based, at least in part, on at least a portion of the data describing the arrangement of the two or more components of the PV system. In some embodiments, determining whether the PV system complies with at least one PV system criterion comprises comparing the arrangement of the two or more components of the PV system to an arrangement of components in a PV system specification, and determining whether the arrangement of the two or more components of the PV system matches the arrangement of components in the PV system specification. In some embodiments, determining whether the PV system complies with at least one PV system criterion comprises determining whether connections between a plurality of components of the PV system comply with the at least one PV system criterion.

In step 306, in response to determining that the PV system complies with the at least one PV system criterion, the PV system may be activated, and/or a user of the PV system may be notified that the PV system complies with the at least one PV system criterion. In some embodiments, method 300 may further comprise sending, to a regulatory entity, at least a portion of the data describing the arrangement of two or more components of the PV system and/or data indicating whether the PV system complies with the at least one PV system criterion. In some embodiments, method 300 may further comprise sending, to an operator of an electrical grid, at least a portion of the data describing the arrangement of two or more components of the PV system and/or data indicating whether the PV system complies with the at least one PV system criterion. In some embodiments, the method may further comprise sending power generation information to the grid's operator, including, without limitation, the PV system's power rating (e.g., power generation capacity), the PV system's address (e.g., the address of the premises on which the PV system is located and/or to which the PV system provides electrical power), an account number corresponding to a customer of the electrical grid at the PV system's address, information describing the PV system's inversion system (e.g., the make(s) and model(s) of the system's inverter(s)), and/or data which the grid operator may use to remotely control (e.g., deactivate) one or more components of the PV system (e.g., the grid interconnection device). Such data may include, in some embodiments, data required by California's Rule 21. It should be appreciated from the foregoing that embodiments are not limited to interconnecting a premises PV system in any particular manner. PV panels may be interconnected to one another and to other components of a DC network and/or AC network in any suitable manner.

Figure 3B:
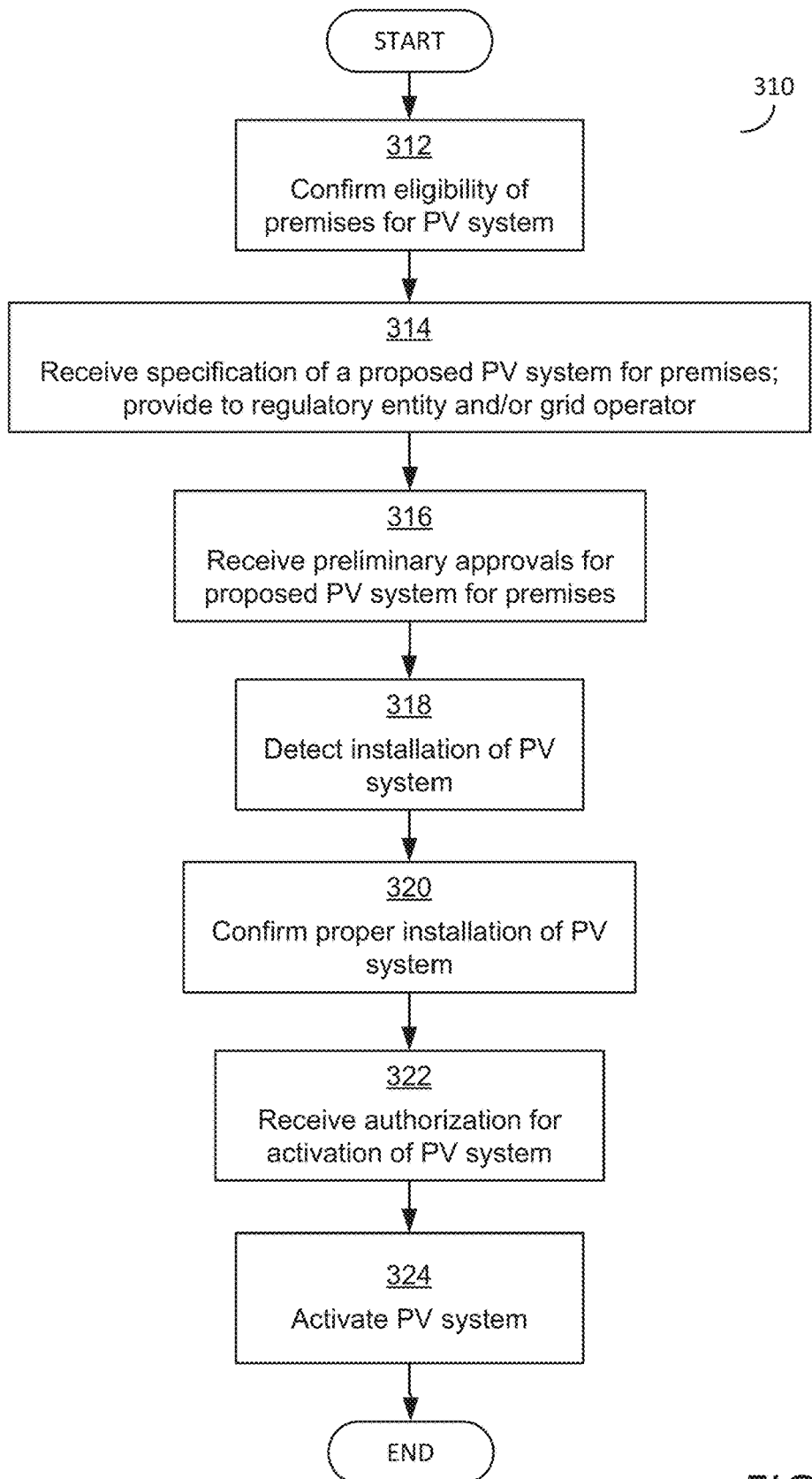
FIGS. 3B-3D are flowcharts of methods for testing a premises PV system for compliance with one or more applicable codes, which may be implemented in some embodiments.

FIG. 3B illustrates another example of a method that may be used for commissioning a PV system at a premises, including for proposing a PV system to be installed at the premises. Prior to the start of the process 310 of FIG. 3B, an owner or operator of a premises may request information regarding a PV system for installation at the premises, such as by indicating a willingness to purchase or requesting a proposal, or by purchasing a system. In response to the indication from the owner/operator of the premises, the process 310 may be performed to commission a PV system at the premises. In some embodiments, the process 310 of FIG. 3B may be carried out by a commissioning facility executing on a server disposed outside of a premises, which may act as an "intermediate server" as discussed above in connection with FIGS. 1-2. The commissioning facility may be a set of executable instructions stored in a storage medium accessible to the server, such as integrated with the server, and executed by one or more processor(s) or other control circuit(s) of the server. The commissioning facility may therefore form an entirety of or a portion of a software application, in some embodiments. In other embodiments, the process 310 may be performed by a premises PV system controller, acting without an intermediate server, or by any other suitable device or entity.

The process 310 begins in block 312, in which the commissioning facility confirms eligibility of the premises for a plug-and-play PV system. Confirming the eligibility of the premises for the PV system may include determining whether an operator of an electrical grid to which the premises is connected, and/or a local regulatory entity, permits PV system to be installed at the premises, or if there are certain criteria that PV systems must meet to be permitted.

For example, a grid operator and/or a local entity may ban PV systems in their jurisdiction, or may ban PV systems in certain areas of the jurisdiction. For example, if a grid operator is aware that a portion of an electrical grid is old or otherwise may not support a load imposed by PV systems in that area, the grid operator may prohibit PV systems at the premises. As another example, if the premises is located in a historically-significant area, the local regulatory authority may prohibit PV systems to preserve a historic character of the area. Grid operators and/or local regulatory entities may have any number of other considerations regarding prohibiting PV systems in their jurisdiction or in certain areas of their jurisdiction. Rather than banning PV systems, in some embodiments the grid operator and/or the regulatory entity may impose requirements on PV systems, in terms of criteria the PV systems must meet to be approved. For example, a local regulatory entity may impose a limit on the size or placement of PV systems, and a grid operator may impose a limit on an operating voltage and/or current of PV systems.

In addition, in block 312, the commissioning system may determine whether the grid operator and/or the local regulatory entity permit plug-and-play PV systems of the type as described herein, including whether the operator and/or entity permit a plug-and-play technique for commissioning as described herein.

Accordingly, in block 312 the commissioning facility determines, based at least on a location of the premises, whether plug-and-play PV systems are permitted by the grid operator and/or local regulatory entity. In some embodiments, the commissioning facility may make the determination based on a data store of information regarding grid operators, regulatory entities, and areas.

If the commissioning facility determines that the premises is not eligible for a PV system, or is not eligible for a plug-and-play PV system, then the commissioning facility may output information indicating that the premises is not eligible. This information may be presented to the owner/operator of the premises in any suitable manner, as embodiments are not limited in this respect.

If, however, the commissioning facility determines that the premises is eligible, or that there are criteria that PV systems must meet, then the approval and/or criteria may be output to the owner/operator, to a vendor or other distributor of PV systems, or to any other party. Upon receipt of the approval and/or the criteria, the recipient of the information may design and propose a PV system for the premises, such as one that satisfies the criteria (if applicable).

In block 314, the commissioning facility on the server receives a specification of the proposed PV system for the premises. The specification may include information on components of the proposed system and connections between the components (including a topology of the system), and may include information on operating parameters of the system such as proposed voltages and/or currents. The specification may include information on a placement of the proposed system on the premises. The specification may be formatted in any suitable manner, as embodiments are not limited in this respect. In some embodiments, the specification may be formatted according to a hardware description language or may be translated into a hardware description language by the commissioning facility. Following receipt of the specification in block 314, the commissioning facility stores the specification in a data store and forwards the specification to a local regulatory entity and/or a grid operator to receive preliminary approval of the proposed PV system. The commissioning facility may, as discussed above, convey the specification to computing devices associated with the local regulatory entity and grid operator or may convey the specification in any other manner (e.g., on paper). In some embodiments, the commissioning facility may use the specification of the proposed PV system to complete one or more forms that is/are used by the local regulatory entity and/or grid operator, such as by electronically inserting information into a template and creating an electronic document, such as a document in the Portable Document Format (PDF) or other format. In cases in which the commissioning facility creates such a form, the form may be communicated to the local regulatory entity and/or grid operator.

In some embodiments, the computing devices of the local regulatory entity and/or grid operator may execute facilities to evaluate the specification of the proposed PV system and determine whether preliminary approval is to be granted. The facilities may form a portion of or an entirety of a software application for execution on those devices. Such a facility may, in the case that criteria apply (as discussed in connection with block 312) to PV systems for the premises, determine whether the specification meets the criteria. The facility may make any suitable determinations, either automatically and/or through user input, and may respond to the commissioning facility with either a grant of preliminary approval for the proposed PV system or a disapproval. In the case of a disapproval, the response may indicate the basis for the disapproval.

Upon receipt of the response, in the case of a disapproval, the commissioning facility may provide the disapproval to the entity that proposed the PV system in block 314 (e.g., the owner/operator of the premises, or a vendor or distributor of PV systems). If a basis for disapproval was provided, the commissioning facility may also provide the basis. In some case, the specification of the proposed PV system may be revised in view of the basis for the disapproval, and re-submitted to the commissioning facility. In this case, the process 310 would return to block 314.

If, however, the commissioning facility receives in block 316 an approval from the local regulatory entity and/or grid operator, then the facility may store the preliminary approvals in a data store. In addition, the commissioning facility may inform the entity that proposed the PV system in block 314 (e.g., the owner/operator of the premises, or a vendor or distributor of PV systems) of the approval.

At this stage (separate from the process 310), payment may be collected from the owner/operator for the PV system as proposed and components of the PV system may be provided to (e.g., shipped to) the entity that will be installing the PV system, which may be the owner/operator of the premises, the vendor, another contractor, or any other suitable party. The installer may then install the PV system by assembling the pieces at the position identified in the proposal for the PV system. Once the installer has assembled the PV system, the installer turns on the PV system, which may include powering on the PV system controller. At initial turn-on, the PV system controller may be configured (and other components of the PV system may be configured) to maintain the PV system in a low-power, idle mode, while the PV controller and the commissioning facility determine whether the PV system was properly installed by the installer.

Once turned on, the PV system controller may communicate with the commissioning facility that is executing on the server. The communication from the PV system controller may use any suitable communication mechanism, including an Internet connection already existing at the premises (e.g., via a wireless local area network (WLAN) installed at the premises or other connection), a wireless wide-area network (WWAN) connection such as a cellular connection, an AMI connection, or any other suitable connection, as embodiments are not limited in this respect.

The commissioning facility, in block 318, detects these communications from the PV system controller and thereby detects installation of the PV system. The commissioning facility may then interact with the PV system to confirm that the PV system has been properly installed, including by receiving data obtained by the PV system controller regarding the PV system, such as obtained through probing the PV system and/or interacting with the installer. The data received from the PV system may include a specification of the PV system, such as a description of components of the system and/or an arrangement of the components of the PV system. The description may, in some embodiments, be in a hardware description language. The data received from the PV system may additionally include information on connections of the PV system, operating parameters of the PV system, or any other information obtained by the PV system that describes an installation of the PV system. In some embodiments, photographs of the PV system as installed may be received.

In block 320, the commissioning facility, based on these communications with the PV system controller and the information received from the PV system controller, determines whether the PV system is properly installed. If it is determined that the PV system is not properly installed, the commissioning facility may store this information and may additionally communicate this to the installer (via the PV system controller) and/or to an owner/operator of the premises, to a vendor of the PV system, or to any other party. In the case that the PV system is not properly installed, the commissioning facility may provide information indicating how it was determined that the PV system is not properly installed, such as information identifying what has been incorrectly installed or how to remedy the incorrect installation.

If, however, the commissioning facility determines, based on the information from the PV system controller, that the PV system is correctly installed, then in block 322 the commissioning facility communicates with the local regulatory authority and/or the grid operator to receive authorization to activate the PV system. The communication to the local regulatory entity and the grid operator, in accordance with techniques discussed herein, may replace some or all of the on-site inspections that may be done by the regulatory entity and/or grid operator. For example, by informing the regulatory entity and the grid operator that the PV system, which was previously proposed to them in block 314 and for which preliminary authorization was received in block 316, has been installed in a correct manner. In accordance with techniques described herein, including techniques described below in connection with FIGS. 3C-3D, the PV system controller may have determined that the PV system has been installed in a safe manner, including an electrically safe manner. The local regulatory entity and/or the grid operator may, in this case, forego an on-site inspection or forego some of the on-site inspections.

The communication to the local regulatory entity and/or grid operator may include communicating data received from the PV system, including data describing the PV system. For example, a description of an arrangement of components in the PV system may be provided, such as a description in a hardware description language. Photographs of the PV system as installed may also be provided. In some embodiments, the commissioning facility may use data received from the PV system to complete one or more forms that is/are used by the local regulatory entity and/or grid operator, such as by electronically inserting information into a template and creating an electronic document, such as a document in the Portable Document Format (PDF) or other format. In cases in which the commissioning facility creates such a form, the form may be communicated to the local regulatory entity and/or grid operator.

As in blocks 314, 316, in block 322 the commissioning facility may in some embodiments communicate to facilities executing on devices associated with the local regulatory entity and/or grid operator. Those facilities, upon receipt of the information from the commissioning facility, may analyze the information regarding the PV system in a manner that is partially or fully automatic, or fully manual, and may return to the commissioning facility a response. The response may indicate whether the regulatory entity and/or the grid operator has approved the PV system for activation, has disapproved the PV system for activation, or will conduct an on-site inspection. In the case that the regulatory entity and/or the grid operator has disapproved activation, or indicated that an on-site inspection will occur, the result may be communicated to the installer, the owner/operator of the premises, the vendor of the PV system, or any other party.

If, however, the regulatory entity and/or the grid operator has approved activation of the PV system, this may be communicated to the PV system controller in block 324. In response, the PV system controller may activate the PV system, or may configure the PV system to be activated (including by removing any impediments to activation, such as the locking mechanisms discussed above) and prompting an installer to activate the PV system. Activation may include connecting the PV system to the electrical grid. Once the PV system is activated and is connected to the electrical grid, the process 310 ends.

Following the process 310, the PV system may function to generate electricity based on solar energy, and may provide that electricity to the premises and/or to the electrical grid.

Figure 3C:
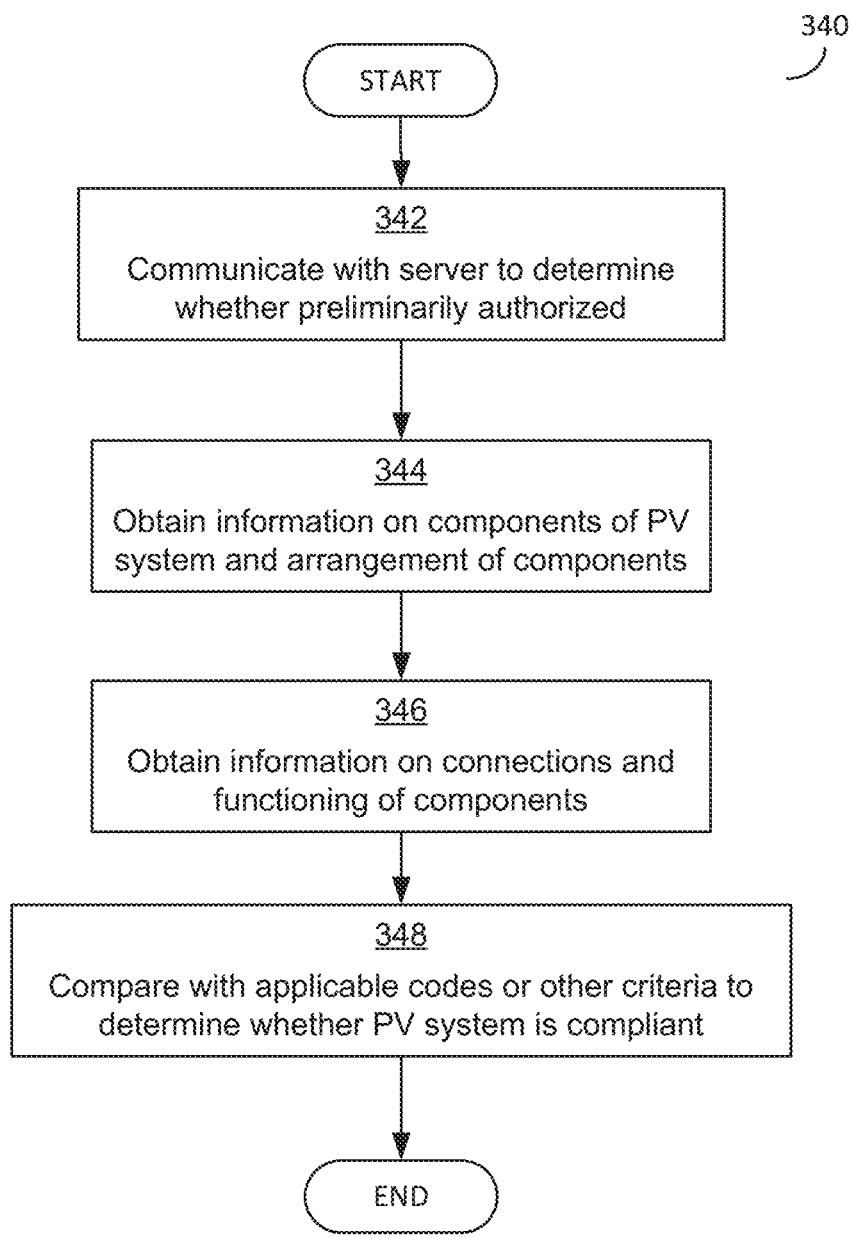
Figure 3D:
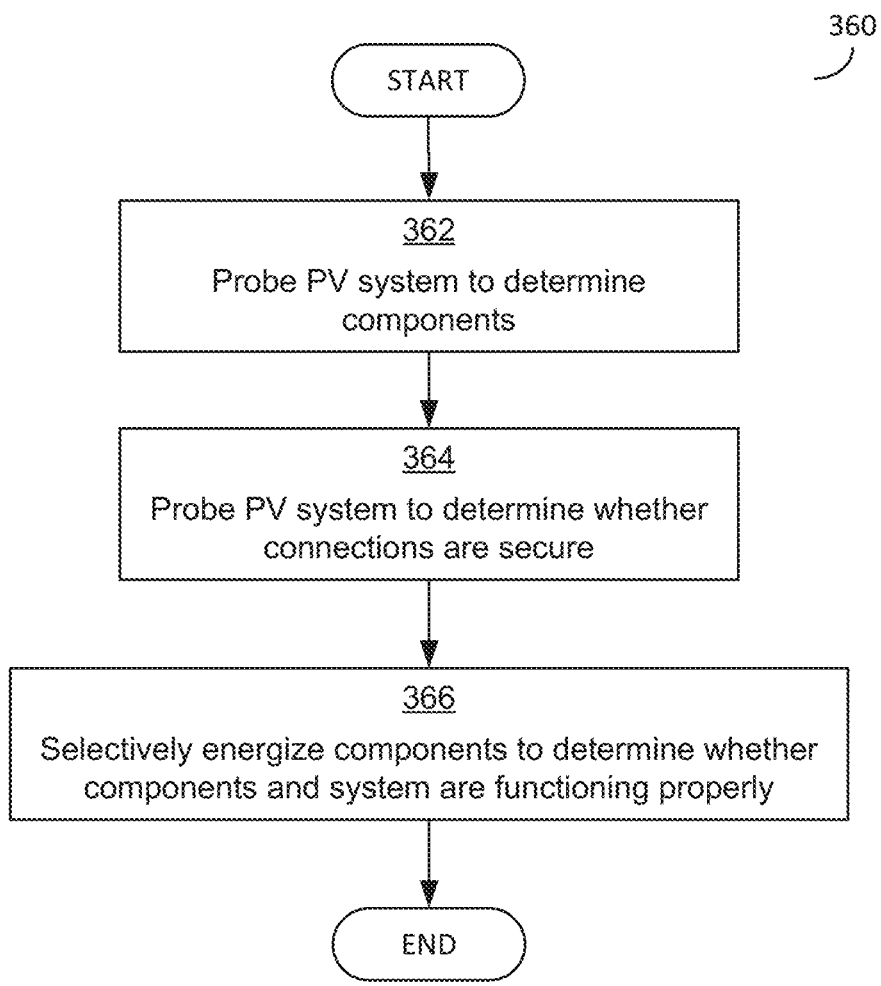

The process 310 of FIG. 3B discussed commissioning of a PV system from the perspective of a facility executing on a server that may be located remote from the PV system and from the premises at which the PV system is installed. FIGS. 3C and 3D illustrate examples of process that may be implemented by a PV system controller to determine whether a PV system is properly installed.

Prior to the start of the process 340 of FIG. 3C, an installer may install a PV system at a premises, including by assembling and interconnecting components of the system. The installer may then power-on the PV system, such as by operating a power switch of the PV system or the PV system controller, or connecting the PV system controller to power. Upon start-up, the PV system and/or PV system controller may be configured to maintain the PV system in an idle state in which the PV panels and other components of the PV system are not energized or are kept in a low-power state, as opposed to a full operational state or a power level corresponding to full operational state.

The process 340 may be implemented by a controller facility executed by the PV system controller of the PV system. The controller facility may be a set of executable instructions stored in a storage medium accessible to the PV system controller, such as integrated with the controller, and executed by one or more processor(s) or other control circuit(s) of the controller. The commissioning facility may therefore form an entirety of or a portion of a software application, in some embodiments.

The process 340 begins in block 342, in which the PV system controller communicates with a commissioning facility of a server (e.g., the commissioning facility discussed above in connection with FIG. 3B) to determine whether preliminary authorization was received for a PV system to be installed at the premises. The PV system controller may provide information, such as a location of the premises or a location of the PV system, or an identifier for the PV system such as a serial number, to the commissioning facility of the server. In response, the commissioning facility may determine whether preliminary authorization was received for a PV system at the premises and provide a response to the PV system indicating such.

The response from the commissioning facility may also, in some embodiments, include information about the authorized PV system (if the PV system was authorized). For example, a specification for the proposed PV system may be provided, indicating a correct (as proposed and authorized) listing of components of the PV system and arrangement of those components. The specification that is provided in the response may be the same specification received by the commissioning facility, such as the one described above in connection with block 314 of FIG. 3B. Accordingly, in some embodiments, the specification may be set forth in a hardware description language.

If the response from the commissioning facility of the server indicates that the PV system was not authorized, then the PV system controller may suspend operation of the PV system and output a message to an installer, and/or to an owner/operator of the premises, that the PV system is not authorized. The message may be output in any suitable manner, including via a user interface of the PV system controller and/or via a message transmitted, via a computer communication network, to another computing device at the premises, such as a computing device (e.g., mobile device, like a tablet or mobile phone) disposed at the premises.

If, however, the response from the commissioning facility of the server indicates that the PV system was authorized, then in block 344 the controller facility may begin obtaining information on the PV system as installed. In block 344, the controller facility may determine information on components of the PV system, such as information identifying all or some of the components that are included in the PV system. Information on an arrangement of components in the system may also be obtained, which may indicate connections between the components. In block 346, the controller facility may obtain information on the state of the connections between the components, such as information indicating whether the connections are secure. A secure connection may be one that is full and proper, both mechanically and electrically, rather than one that is loose or otherwise not fully correct. In block 346, the controller facility may also determine information on the functioning of at least some of the components of the PV system and determine whether the components are functioning properly.

As discussed above, the controller facility may obtain the information in blocks 344, 346 through communicating to components of the PV system and/or through operating the components of the PV system. Examples of ways in which the controller facility may obtain this information are described in detail below in connection with FIG. 3D.

In block 348, based on the obtained information, the controller facility may determine whether the PV system was properly installed. In particular, the controller facility may compare the obtained information to applicable codes or other criteria to determine whether the criteria are met. When the criteria are met, the controller determines that the PV system has been properly installed.

The applicable codes may include any suitable set of codes that may be used to determine whether a PV system is properly installed.

For example, the controller facility may evaluate electrical codes, such as the National Electric Code (NEC). In some embodiments, each of the requirements of the NEC may be expressed in a hardware description language or other structured format, and the controller facility may determine whether each of those requirements is met. The controller facility may determine, for some of the requirements, whether the requirements are met by evaluating information obtained from the PV system, such as by evaluating information on the functioning of components or connections between components. The controller facility may determine, for some of the components, whether the requirements are met by evaluating information identifying some of the components. For example, if a requirement is known to be met by a component, by identifying that the component is included in the PV system, the controller facility may conclude that the requirement is met by the presence of that particular component in the PV system.

As another example, the applicable codes may include codes that regulate which types of PV systems are permitted to be installed at the premises. For example, as discussed above, a local regulatory entity and/or a grid operator may regulate the types of PV systems in an area, such as the size of PV systems or operating power parameters of a PV system. The controller facility may therefore compare components of the PV system or other information about the PV system to these criteria to determine whether the criteria are met.

As a further example, the controller facility may compare information regarding the PV system as installed, such as an arrangement of components in the system and operating parameters of the system, to a specification of the PV system that was proposed to be installed. As discussed above, a commissioning facility at a server may transmit the specification for the proposed system to the controller facility. The controller facility may compare information on the PV system that has been determined by the controller facility to the specification to determine that the PV system as installed matches the specification. For example, the controller facility may determine that a topology of the installed system matches a proposed topology, or that components included in the installed system match proposed components. As another example, the controller facility may determine that operating parameters of the installed system, such as an operating voltage or current, matches operating parameters of a proposed system.

Any suitable criteria may be considered by the controller facility in block 348, to determine (without the necessity of an on-site inspection by a local regulatory entity or a grid operator) whether a PV system is properly installed and should be authorized. A result of the comparison may then be provided by the controller facility to a commissioning facility on a server. The result may, in some cases, be accompanied by information obtained by the controller facility and on which the result was based. As discussed above, the commissioning facility may then provide this information to the local regulatory entity and/or to the grid operator, to enable those parties to provide authorization for the PV system without the need for, or with a reduced need for, an on-site inspection of the PV system.

Once the controller facility performs the comparison of block 348, the process 340 ends.

While in the example of FIG. 3C, the controller facility communicates (in block 342) to an intermediate server to determine whether preliminary authorization was received, it should be appreciated that embodiments are not limited to operating with an intermediate server. For example, the controller facility may communicate directly to devices of a local regulatory entity and/or a grid operator, or with an installer of the PV system via a user interface, to determine whether preliminary authorization was received. In other embodiments, the controller facility may not determine whether preliminary authorization was received. In some such embodiments, the controller facility may execute a process that begins with the processing of block 344 and does not carry out the operations described above in connection with block 342. In other embodiments, one or more of the exemplary actions discussed in connection with the process 340 may be omitted.

FIG. 3D illustrates an example of a process that may be implemented in some embodiments by a controller facility to obtain information about a PV system as installed, to collect the types of information described above in connection with blocks 344, 346 of FIG. 3C. The process 360 of FIG. 3D begins in block 362, in which the controller facility probes the PV system to determine the components included in the PV system.

Probing the PV system in block 362 may include communicating messages to components of the PV system requesting information about the components. For example, the controller facility may perform power line communication (PLC) to communicate via a power bus or other power line to components of the PV system. As another example, the controller facility may communicate via other connections to components of the PV system, such as dedicated communication lines. Each of the components, or sets of two or more components, may be provided with a chip or other device that stores identifying information for the component(s). The controller facility may obtain this information through communicating to the component(s).

In some cases, identifying one component may assist the controller facility with identifying one or more other components. For example, based on information on compatibility of components, the controller facility may conclude based on the presence of one component that another component must necessarily be or are likely to be present. These other components may be components that are required to be included in a PV system including one component, or that are complementary with one component, and are thus likely to be included when the one component is identified. As a specific example, the controller facility may determine through probing that one type of PV panel is included in the PV system, and the controller facility may have access to information indicating that this type of PV panel has a proprietary connector (e.g., a terminal having a particular shape). If the controller facility determines that the PV panel is correctly connected to a wire/cable, and has access to information indicating that only one wire/cable has the complementary proprietary connector, then the controller facility may be able to identify the wire/cable as another component of the system. As another specific example, the controller facility may obtain the current rating of a cable used in the system and compare the current rating to information on other component(s) of the PV system. For example, the controller facility may compare the current rating to a current rating for one or more of the PV panels installed in the system, or for all of the PV panels installed in the system, and determine that the cable is insufficient to carry current that is expected to be generated by the PV panel(s). Thus, for example, the controller facility may determine, based on the comparison, that the current rating of the cable is sufficient for the number of PV panels installed in the PV system.

Through selectively energizing components of the PV system and identifying those components, then identifying other components to which those components are connected (either by querying those components or using stored information about complementary components), the controller facility may identify an arrangement of components in the PV system. The information on the arrangement of components may include information on a topology of the components.

In block 364, the controller facility may also probe connections between components in the PV system to determine whether the connections are secure. In some embodiments, connections between components may use active connectors that are able to sense their own status, such as using pins (e.g., "last make/first break" pins) or other structures to determine whether the connection is complete and proper. In such cases, the controller facility may communicate with these active connectors, such as using PLC or another network connection, or may access information generated by these connectors. In other embodiments, the controller facility may probe connections using sense signals. For example, the controller facility may apply low-power signals to connections in the PV system and monitor how the system reacts to the low-power signal. For example, the controller facility may monitor impedances throughout the PV system. Impedance values may, in some cases, indicate a connection that is not a secure connection, such as one that is not a full and complete connection. Similarly, the controller facility may probe whether the PV system is properly connected to ground, by using such low-power signals to determine whether there is a proper system ground.

In block 366, after determining in blocks 362 and 364 which components are included in the system and confirming that the connections are secure, the controller facility may begin switching the PV system into full operational mode. During blocks 362 and 364, the controller facility may maintain the PV system in a low-power state, to prevent any safety problems that may arise through fully energizing the PV system when a component is misconnected or otherwise incorrectly installed.

It should be appreciated that while the example of FIG. 3C illustrated the controller facility obtaining information on the system and, after obtaining the information, evaluating the information with regard to criteria, in some embodiments the obtaining of information may be interleaved with evaluation of criteria. For example, in some embodiments, after identifying components and an arrangement of components, the controller facility may determine whether the components and arrangement match the proposed specification for the PV system. If the components and arrangements match, the controller facility may then determine whether the connections are secure, by injecting low-power sense signals into the PV system. If the facility determines that the connections are secure, then the facility may begin selectively energizing the system to a high-power state, in block 366. Through this iterative process, safety concerns from incorrect installations may be mitigated.

Accordingly, in block 366, the controller facility may begin selectively energizing components of the system. For example, the facility may energize each of the components in isolation. Upon energizing a component, the facility may determine whether operating parameters (e.g., voltage and current) of the panel, based on a signal output from the panel, are within expected ranges. The facility may also energize groups of two or more components, such as multiple PV panels within a string or all PV panels in a string, or all strings. By analyzing a signal output from such a collection of components, the controller facility may determine whether the components are interoperating correctly, and thus whether the components are connected properly. For example, for a string of PV panels, the controller facility may determine whether a total voltage output from the string is within an expected range of a sum of the voltages output from the individual PV panels of the string.

Once the controller facility has obtained the information in block 366, the process 360 ends.

Figure 5:
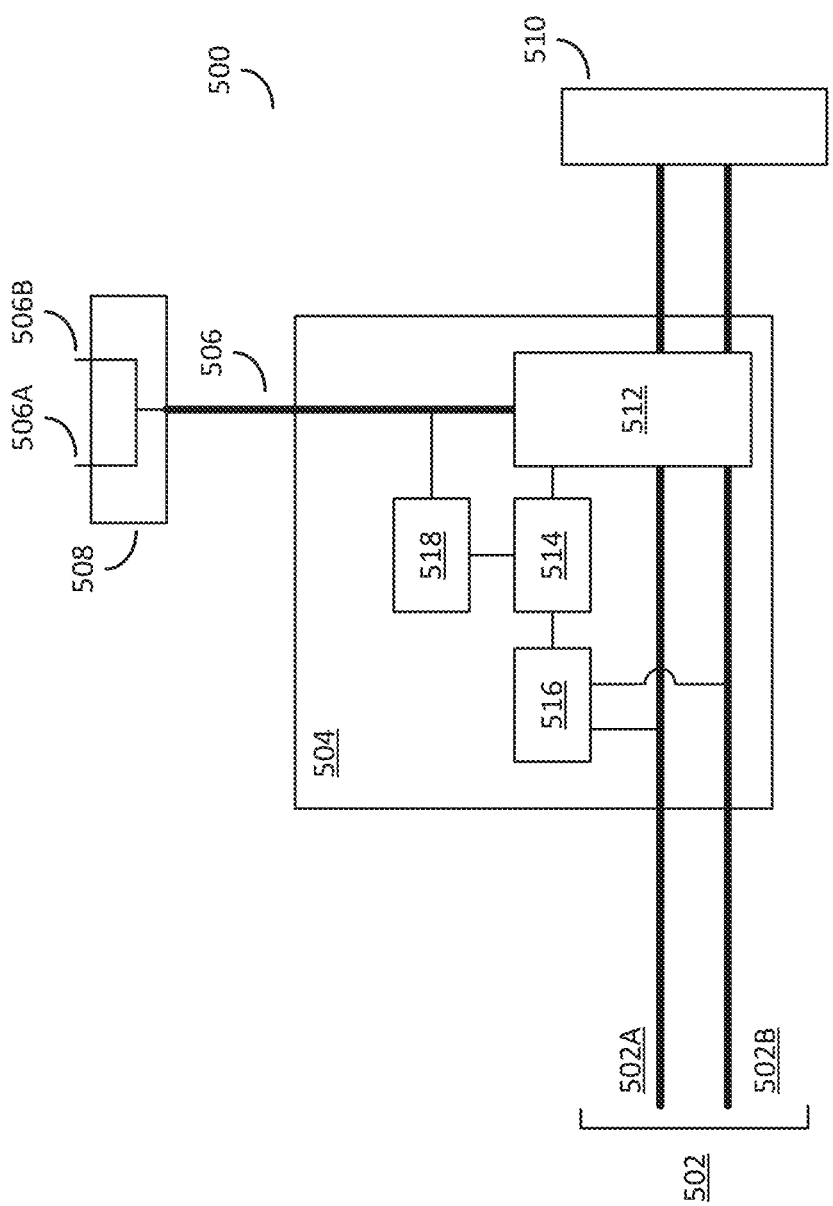
FIG. 5 is a block diagram of some examples of components that may be included in some embodiments of a cable assembly.

FIGS. 4-5 illustrate an example of a cable assembly that may be used in some embodiments to interconnect a set of multiple PV panels and circuitry of a DC network. The cable assembly of FIGS. 4-5 may be used in some embodiments, for example, to connect a string of PV panels (e.g., string 241a of FIG. 2) to one another and to a DC combiner (e.g., combiner 242 of FIG. 2) of a DC network. As should be appreciated from the foregoing and from the discussion of the assemblies below, cable assemblies as described in connection with FIGS. 4-5 may be advantageous in some embodiments in which a PV system controller probes a PV system to produce information describing a PV system.

FIG. 4 illustrates a system 400 that includes a set 402 of PV panels, a cable assembly 404, and a DC combiner 408. The PV panels of the set 402 may be implemented in any suitable manner, including in accordance with examples of PV panels described above. The DC combiner 408 may be implemented in any suitable manner, including in accordance with examples of DC combiners discussed above.

The cable assembly 406 interconnects the PV panels 402A, 402B, 402C and the DC combiner 408, such as by including a power bus (discussed in more detail below in connection with FIG. 5) that creates a series connection between the panels 402A, 402B, 402C to the combiner 408. As illustrated in FIG. 4, the cable assembly 406 comprises multiple control circuits 406A, 406B, 406C, spaced apart along a length of the cable assembly, that are each individually associated with one of the panels 402A, 402B, 402C. The cable assembly 404 further includes a cable 410 that includes the power bus. The control circuits 406A, 406B, 406C may be integrated with the cable 410, in that the cable assembly 404 may be constructed and arranged such that the control circuits 406A, 406B, 406C are not intended to be and are designed not to be separated from the cable 410 during normal usage of the cable assembly 404.

Each of the control circuits 406A, 406B, 406C may be paired to one of the panels 402A, 402B, 402C and may have a direct cable connection to the paired panel. As illustrated in FIG. 4, each control circuit may be connected to its paired panel via one or more panel cables. Each panel cable may be terminated with one connector of a pair 412 of connectors. The connector on the panel cable may have a shape that is complementary to a shape of a panel-side connector. The cable assembly 404 may also terminate with one connector of a pair 414 of connectors. The connector on the cable assembly 404 may have a shape that is complementary to a shape of a connector on circuitry of a DC network, for example, a connector of a DC combiner 408. The connectors 412, 414 may be arranged to be removably connected and either or both may have an environmental seal, which may make an electrical connection area within the connectors 412, 414 watertight and/or airtight.

In some embodiments, the different connectors of a cable assembly 404 may each be a keyed connector, such that the different connectors have a different shapes and are incompatible with non-corresponding connectors of other parts of a PV system. For example, each cable-side connector of the connector pairs 412 may have a shape that is compatible with each PV panel-side connector of the pairs 412 and a shape that is incompatible with the network-side connector of the pair 414. Similarly, the cable-side connector of the pair 414 may have a shape that is incompatible with the PV panel-side connectors of the pairs 412. In some such embodiments, each type of connector (e.g., each connector that is intended to connect two types of components in the PV system and/or to convey a particular signal or set of signals, or that is intended to convey a signal having a particular electrical characteristic or range of electrical characteristics) included in the cable assembly 404 may be a keyed connector such that the each connector is only compatible with corresponding connectors, such as only compatible in a correct orientation, and is incompatible with non-corresponding connectors. This may ease installation of the cable assembly 404 by preventing incorrect connections. This may also increase a safety of installation and decrease a likelihood of damage to the PV system from incorrect installation.

Embodiments are not limited to including any particular number of control circuits or panel cables. In some embodiments, however, it may be advantageous to limit a number of PV panels that may be connected to one cable assembly. For example, to aid a layperson in easily complying with applicable building codes or other reasons, it may be advantageous to allow only up to a certain number of PV panels to be connected to a single cable assembly. Accordingly, in such embodiments, the cable assembly may include a certain number of control circuits and/or a certain number of panel cables (or sets of panel cables, in a case that a control circuit is connected to a particular PV panel via more than one panel cable).

Embodiments that include a cable assembly of the type illustrated in FIG. 4 are not limited to implementing the cable assembly in any particular manner. FIG. 5 illustrates an illustrative implementation of a cable assembly, but it should be appreciated that others are possible.

FIG. 5 illustrates an example of components that may be included in a cable assembly and in a control circuit of a cable assembly in some embodiments. Cable assembly 500 of FIG. 5 includes a power bus 502, a control circuit 504 that is integrated with the power bus 502, and at least one panel cable 506 that is designed to connect control circuit 504 to a PV panel with which the control circuit is to operate. The control circuit 504 may be integrated with the panel cable(s) 506. The control circuit 504 may include a housing in which various components are disposed and may include an environmental seal, which may make the housing of the control circuit 504 watertight and/or airtight. The power bus 502 and the panel cable(s) 506 may extend from the housing and from the environmental seal.

In the example of FIG. 5, the power bus 502 includes a positive power bus 502A and a negative power bus 502B (which may also be termed a ground bus), though in some embodiments the negative/ground bus 502B may be omitted. The power bus 502 may be disposed inside a cable housing (not shown in FIG. 5), which may be a single cable housing that includes both the buses 502A, 502B or may be separate cable housings.

As with the power bus 502, the panel cable 506 may include a cable housing (not shown in FIG. 5), and may include a single cable housing for each of the panel cables. In some embodiments, the panel cable(s) 506 may include multiple wires that each connects to a PV panel with which the control circuit 504 is to operate, which may include, for example, a positive panel connection 506A and/or a negative panel connection 506B to carry power generated by the PV panel to the control circuit 504 and the power bus 502. In some such embodiments, the multiple wires may be disposed together in a single cable housing of a single panel cable 506, while in other embodiments each wire may be provided with a separate cable housing, or the wires may be combined in any suitable manner to form multiple panel cables 506. Each panel cable 506 is terminated with a connector 508, which may have a shape that is complementary with a shape of a corresponding connector on a PV panel. The connector 508 may be adapted to removably couple to the corresponding connector on the PV panel. It should be appreciated that, in embodiments that include multiple panel cables 506, the panel cables 506 are not limited to terminating with the same connector and that different connectors may be used.

Similarly, the power bus 502 terminates in a connector 510. The connector 510 may have a shape that is complementary to a connector of a DC network component, such as a DC combiner, and may be adapted to removably couple to the corresponding connector.

FIG. 5 illustrates several examples of components that may be included in the control circuit 504 and disposed within the housing of the control circuit 504. As illustrated in FIG. 5, the control circuit 504 may include one or more switches 512 that connect the panel connections 506A, 506B to the power bus 502A, 502B. Through operation of the switch(es) 512, a PV panel with which the control circuit 504 is paired may be added to a string of PV panels or removed from the string of PV panels. The switch(es) 512 may be implemented in any suitable manner, as embodiments are not limited in this respect. In some embodiments, the switch(es) 512 may be implemented such that when the paired PV panel is removed from the string, the power bus 502 is shorted across the control circuit 504 to electrically interconnect other panels of a string without the paired PV panel. In other embodiments, however, the switch(es) 512 may be implemented such that removal of the paired PV panel leaves an open connection in the power bus 502 that prevents electrical power from passing across the control circuit 504.

The switch(es) 512 may be controlled in any suitable manner, including by a central controller such as the premises PV system controller discussed above. In the example of FIG. 5, a controller 514 of the control circuit 504 controls a state of the switch(es) 512. The controller may be implemented in any suitable manner, including as at least one processor executing instructions stored in a storage medium. The controller 514 may control the state of the switch(es) 512 responsive to instructions received from a premises PV system controller. The controller 514 may receive the instructions in any suitable manner, including via a communication circuit 516. In some embodiments, the communication circuit 516 may be connected to the power bus 502 and communicate via a power line communication (PLC) protocol, and may receive instructions from the premises PV system controller via a PLC signal received via the power bus 502. Embodiments are not so limited, however. In other embodiments, the communication circuit 516 may receive instructions from the premises PV system controller via wireless communication, via one or more wired communication links (not shown in FIG. 5) running parallel with the power bus 502, or in any other suitable manner.

The controller 514 may communicate any suitable information to the premises PV system controller regarding a paired panel, and may receive an instruction to operate the switch(es) 512 in response to any such information. The control circuit 504 may additionally include one or more monitoring circuits 518 that detect information regarding the paired PV panel and/or receive from the paired PV panel information regarding that panel, and that provide that information to the controller 514. The monitoring circuit(s) 518 may be implemented in any suitable manner and may, in some embodiments, include one or more sensors to receive or detect conditions relating to a paired PV panel as part of monitoring the paired PV panel. For example, in some embodiments the monitoring circuits 518 may include circuitry for monitoring a performance of the paired PV panel. Monitoring the performance may include monitoring one or more electrical characteristics of the panel, such as by monitoring a power (e.g., a voltage) output by the paired PV panel at a time or over time. Monitoring the performance may additionally or alternatively include monitoring a maximum power point of the panel over time. This performance information may be indicative of whether the panel is functioning properly and may be communicated to the premises PV system controller for analysis to determine whether the panel is functioning properly and/or whether a system is functioning properly or to perform control of the PV panels and/or other components of a PV system. For example, the premises PV system controller and/or controller 514 of cable assembly 500 may control a PV panel and/or components of a PV system to ensure power output at a maximum power point. For example, the premises PV system controller may control an impedance matching of a control circuit 504 and/or a DC network to which the cable assembly 500 connects to ensure maximum power output from a string of PV panels and/or a particular PV panel.

As another example, monitoring circuits 518 may include circuitry to monitor a total voltage of a string of PV panels (e.g., string 241*a* of FIG. 2) that is interconnected by the cable assembly 500. The controller 514, in response to determining via the monitoring circuits 518 that a total voltage is outside of a particular voltage range, may operate the switch(es) 512 to add or remove a PV panel from the string. This may be advantageous in some embodiments because, by controlling a total string voltage to be within a certain voltage by adding or removing PV panels from the string dynamically, more panels may be added to a string than may be advisable without such control.

As another example, in some embodiments the monitoring circuits 518 may include an identification circuit that may receive from the paired PV panel identifying information for the panel, such as information identifying a brand and/or model of panel and/or an operating specification for the panel. The identifying information, once received by the monitoring circuit 518, may be communicated by the controller 514 and communication circuit 516 to the premises PV system controller, which may collect the information as part of commissioning the premises PV system as discussed above.

As another example, in some embodiments the monitoring circuits 518 may include a circuit to detect whether the panel connector is properly connected to a connector on the paired PV panel. Any suitable technique for determining whether a connector is properly connected may be used, including known techniques, as embodiments are not limited in this respect. In some such embodiments, for example, the circuit 518 may pass a signal to the paired PV panel and analyze a signal received in response to determine whether the response signal has characteristics expected of a signal received via a proper connection. A determination made by the monitoring circuit 518 may be passed to the controller 514 and communication circuit 516 for communication to the premises PV system controller. In some embodiments, in a case that the monitoring circuit 518 determines that the connector is not properly connected to the paired PV panel, the controller 514 may operate the switch(es) 512 to disconnect the paired PV panel from the power bus 502. The controller 514 may be programmed to take that action on its own or in response to a disconnect instruction received from the premises PV system controller.

The monitoring circuit(s) 518 may be connected to a paired PV panel in any suitable manner. In some embodiments, the circuits 518 may be connected via the positive and negative panel connections 506A, 506B. In other embodiments, the panel cable(s) 506 may additionally include other wires that are specific to one or more of the monitoring circuits 518. For example, the panel cable(s) 506 may include one or more wires dedicated to communicating identifying information for a panel from the panel to a monitoring circuit 518. As another example, the panel cable(s) 506 may include one or more wires dedicated to communicating signals regarding a connection test for a connector to determine whether the connector is properly connected. As discussed above, the panel cable(s) 506 are not limited to arranging wires of the cable(s) 506 in any particular manner and the wires may be arranged into any suitable combination of one or more cable housings with associated connectors.

In some embodiments, the communication circuit 516 may also communicate to a premises PV system controller, alone or together with data generated by controller 514 and/or monitoring circuits 518, information on a location of the paired PV panel. The location information that is transmitted may be relative location information that identifies a location of the panel relative to other panels in a set or relative to a string of PV panels. For example, the control 504 circuit may store data identifying a position of the control circuit 504 within the cable assembly, such that the control circuit 504 is in the fourth position from the end of the cable assembly. That information may be useful to identify a relative position of a PV panel in a string, such as that the paired PV panel is in the fourth position of the string. The premises PV system controller may use the location information as part of processing data received from the control circuit 504 regarding the paired PV panel. For example, if the data regarding the paired PV panel indicates that the panel is malfunctioning, then the premises PV system controller may output, via a user interface, an indication that a panel is malfunctioning together with the location information to assist a user in servicing the panel that is malfunctioning.

While FIGS. 4-5 illustrated an example of a cable assembly in which control circuits were individually paired to PV panels, it should be appreciated that embodiments are not so limited. In some embodiments, a control circuit of a cable assembly may be connected to any suitable number of PV panels, including two or more. For example, in one embodiment a cable assembly may include one control circuit for every two PV panels. In some embodiments, a cable assembly may connect to multiple PV panels and include only a single control circuit.

Figure 6:
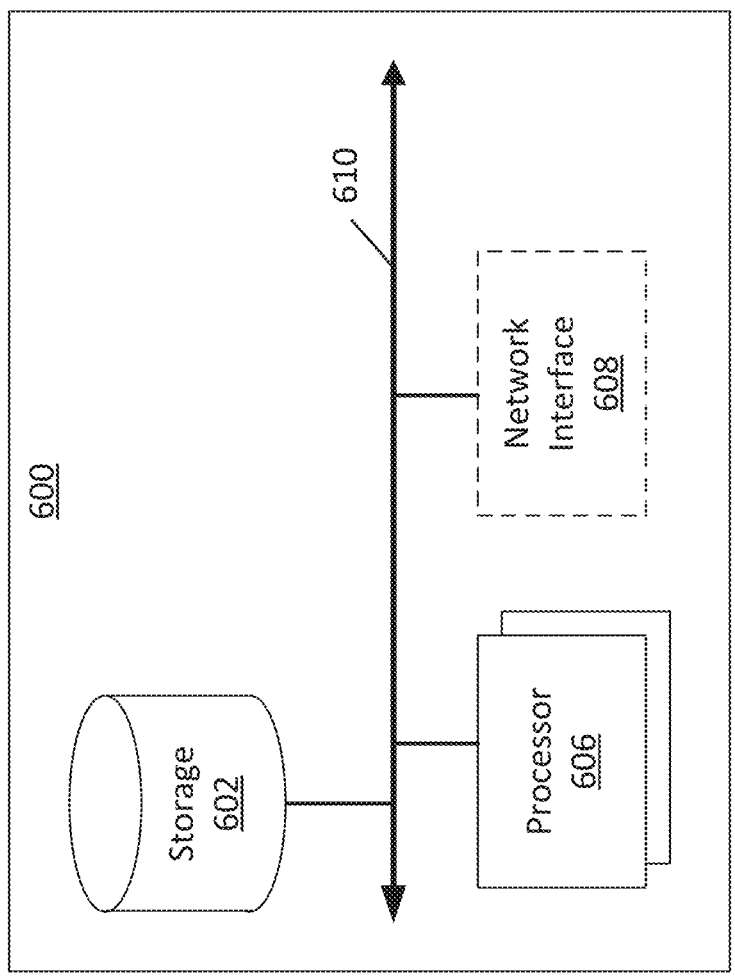
FIG. 6 is a block diagram illustrating a computing device, according to some embodiments.

FIG. 6 illustrates a computing device, according to some embodiments. A premises PV system controller in accordance with the techniques described herein may take any suitable form, as embodiments are not limited in this respect. In some embodiments, a premises PV system controller may be implemented using a computing device 600 as illustrated in FIG. 6. In some embodiments, a computing device 600 may be configured to perform one or more aspects of a PV system commissioning method, in accordance with some embodiments. One or more computing devices such as computing device 600 may be used to implement any of the commissioning tasks described above. The computing device 600 may include one or more processors 606 and one or more computer-readable storage media 602 (i.e., tangible, non-transitory, computer-readable media), e.g., one or more volatile storage media and/or one or more non-volatile storage media. The one or more processors 606 may control writing of data to and reading of data from the storage 602 in any suitable manner. The one or more processors 606 may control movement of data on interconnection network 610 in any suitable manner.

To perform any of the commissioning tasks described herein, the one or more processors 606 may execute one or more instructions stored in one or more computer-readable storage media (e.g., storage 602), which may serve as tangible, non-transitory, computer-readable media storing instructions for execution by one or more processors 606. In some embodiments, one or more processors 606 may include one or more processing circuits, including, but not limited to, a central processing unit (CPU), a graphics processing unit (GPU), a field-programmable gate array (FPGA), an accelerator, and/or any other suitable device (e.g., circuit) configured to process data.

In some embodiments, computing device 600 may include a network interface 608 suitable for processing communication between computing device 600 and one or more remote computers over one or more networks (e.g., computer networks). In some embodiments, computing device 600 may be configured to use network interface 608 to obtain data associated with components of a PV system (e.g., by communicating with one or more communication interfaces (246, 252, 262)). In some embodiments, computing device 600 may use network interface 608 to communicate with a remote computer of a premises operator 122, an electrical grid operator 124, and/or a regulatory entity 126.

The computer network(s) over which network interface 608 communicates may include a local area network (LAN), a wide area network (WAN), an intranet, the Internet, a power-line communication network, a wired communication network, a wireless communication network, and/or any other suitable network. In some embodiments, network interface 608 may send and/or receive data using any suitable communication protocol and/or standard, including, without limitation, TCP/IP, UDP, HTTP, HTTPs, FTP, POP, IMAP, ICMP, I2C. PPP, E6, SSL, SFTP, SSH, Bluetooth, WiFi, WiMAX, GSM, 2G, 3G, 4G, LTE, and/or the IEEE 802 family of standards. Embodiments are not limited by the manner in which computing device 600 communicates with one or more remote computing devices.

It should be appreciated from the foregoing that some embodiments are directed to commissioning methods, as illustrated in FIG. 3. Such methods may be performed, for example, by one or more components of a computing device 600, although other implementations are possible, as the methods are not limited in this respect.

Additional Embodiments

Techniques described may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The above-described embodiments can be implemented in any of numerous ways. For example, the embodiments may be implemented using hardware, software or a combination thereof. When implemented in software, the software code can be executed on any suitable processor (e.g., processing circuit) or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, various aspects may be embodied and/or implemented at least in part as at least one computer-readable storage medium (i.e., at least one tangible, non-transitory computer-readable medium) encoded with a computer program (a plurality of instructions), which, when executed on one or more processors, cause the above-discussed steps or acts to be performed. Examples of a computer-readable storage medium may include, but are not limited to, a computer memory, a floppy disk, a compact disc, an optical disc, a magnetic tape, a flash memory, a circuit configuration in a Field Programmable Gate Array (FPGA) or other semiconductor device, or other tangible, non-transitory computer-readable medium. As is apparent from the foregoing examples, a computer readable storage medium may retain information for a sufficient time to provide computer-executable instructions in a non-transitory form. The computer-readable storage medium may be transportable, such that the program or programs stored thereon can be loaded onto one or more different computers or other processors to implement various aspects of the present technology as discussed above. In some embodiments, processing of data and aspects of system operation may be implemented entirely, or at least in part, in FPGAs as hard-wired computer-executable instructions.

Computer-executable instructions may be in any one or combination of several forms, such as program modules, executed by one or more computers or other devices. Generally, program modules may include routines, programs, objects, components, data structures, etc. that perform particular tasks or implement particular abstract data types. Typically the functionality of the program modules may be combined or distributed as desired in various embodiments.

Computer-executable instructions may be executable on one or more processors that employ any one of a variety of operating systems or platforms. Additionally, such instructions may be written using any of a number of suitable programming languages and/or programming or scripting tools, and also may be compiled as executable machine language code or intermediate code that is executed on a framework or virtual machine.

Processors may be implemented as circuits (e.g., integrated circuits), including commercially-available circuits known in the art by names such as CPU chips, GPU chips, microprocessors, microcontrollers, or co-processors. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially-available, semicustom, or custom-built. As a specific example, some commercially-available microprocessors have multiple cores such that one or a subset of those cores may constitute a processor suitable for implementing functionality described above. Though, a processor may be implemented using logic circuitry in any suitable format.

A data-processing device may be embodied in any of a number of forms, such as a rack-mounted computer, a desktop computer, a laptop computer, or a tablet computer. Additionally, a data-processing device may comprise embedded data-processing circuitry in a device not generally regarded as a computer but with suitable processing capabilities, including a Personal Digital Assistant (PDA), a smart phone, or any other suitable portable or fixed electronic device.

It should be appreciated that the foregoing description is by way of example only, and embodiments are not limited to providing any or all of the above-described functionality, although some embodiments may provide some or all of the functionality described herein.

The embodiments described herein can be implemented in any of numerous ways, and are not limited to any particular implementation techniques. Thus, while examples of specific implementation techniques are described below, it should be appreciated that the examples are provided merely for purposes of illustration, and that other implementations are possible.

The terms "program" or "software" are used in a generic sense to refer to computer code or set of computer-executable instructions that can be employed to program a computer or other processor to implement various aspects of the present technology as discussed above. Additionally, in some embodiments, one or more computer programs that when executed perform methods of the present technology need not reside on a single computer or processor, but may be distributed in a modular fashion amongst a number of different computers or processors to implement various aspects of the present technology.

The indefinite articles "a" and "an," as used in the specification and in the claims, unless clearly indicated to the contrary, should be understood to mean "at least one."

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for commissioning a photovoltaic (PV) system to be installed at a premises, the PV system comprising a plurality of PV panels and electrical components to connect the plurality of PV panels and an electrical grid, the PV system further comprising a PV system controller comprising at least one processor and at least one transceiver to communicate from the PV system to one or more devices outside the premises, the method comprising:

obtaining, with the PV system controller of the PV system, data describing an arrangement of two or more components of the PV system, the two or more components comprising at least some of the plurality of PV panels and at least some of the electrical components of the PV system;

performing, with the at least one processor, a test of the PV system, wherein performing the test includes determining, based, at least in part, on at least a portion of the data describing the arrangement of the two or more components of the PV system, whether the PV system complies with at least one PV system criterion, wherein determining whether the PV system complies with at least one PV system criterion comprises:

comparing the arrangement of the two or more components of the PV system to an arrangement of components in a PV system specification; and determining whether the arrangement of the two or more components of the PV system matches the arrangement of components in the PV system specification;

sending, to a regulatory entity, at least a portion of the data describing the arrangement of two or more components of the PV system and/or data indicating whether the PV system complies with the at least one PV system criterion; and in response to determining that the PV system complies with the at least one PV system criterion, activating the PV system and/or notifying a user of the PV system that the PV system complies with the at least one PV system criterion.

2. The method of claim 1, wherein obtaining the data describing the arrangement of the two or more components of the PV system comprises:

receiving data identifying the two or more components of the PV system.

3. The method of claim 2, wherein:

obtaining the data describing the arrangement of the two or more components of the PV system comprises obtaining data describing a topology of electrical connections among the two or more components of the PV system, comparing the arrangement of the two or more components of the PV system to an arrangement of components in a PV system specification comprises comparing the topology of electrical connections among the two or more components of the PV system to a topology of electrical connections in the PV system specification, and determining whether the arrangement of the two or more components of the PV system matches the arrangement of components in the PV system specification comprises determining whether the topology of electrical connections among the two or more components of the PV system matches the topology of electrical connections in the PV system specification.

4. The method of claim 1, wherein obtaining the data describing the arrangement comprises, with the PV system controller, probing the PV system to identify components included in the PV system and to identify the arrangement of the two or more components.

5. The method of claim 1, wherein:

the PV system specification is a specification for a proposed PV system at the premises; and determining whether the arrangement of the two or more components of the PV system matches the arrangement of components in the PV system specification comprises determining whether the arrangement of the two or more components of the PV system at the premises matches the arrangement of components in the specification for the proposed PV system at the premises.

6. The method of claim 1, wherein determining whether the PV system complies with at least one PV system criterion comprises:

determining, based on at least in part on the data obtained by the PV system controller, whether connections between a plurality of components of the PV system are fully connected.

7. The method of claim 1, wherein sending the at least the portion of the data describing the arrangement of two or more components of the PV system and/or data indicating whether the PV system complies with the at least one PV system criterion comprises:

communicating from the PV system controller to at least one computing device associated with an authority having jurisdiction over the premises.

8. The method of claim 7, wherein communicating to the at least one computing device associated with the regulatory entity comprises communicating to at least one computing device associated with a municipal inspection service of a municipality in which the premises are located.

9. The method of claim 1, wherein sending the at least the portion of the data describing the arrangement of two or more components of the PV system and/or data indicating whether the PV system complies with the at least one PV system criterion comprises:

communicating, from the PV system controller to an intermediate server, a request to convey the at least the portion of the data describing the arrangement of two or more components of the PV system and/or data indicating whether the PV system complies with the at least one PV system criterion to the regulatory entity.

10. The method of claim 1, further comprising:

sending, to an operator of the electrical grid, a power rating of the PV system, an address of a premises associated with the PV system, and/or information describing an inversion system of the PV system.

11. The method of claim 10, wherein:

sending the power rating of the PV system, the address of a premises associated with the PV system, and/or the information describing an inversion system of the PV system comprises communicating, from the PV system controller to an intermediate server, a request to convey the power rating of the PV system, the address of a premises associated with the PV system, and/or the information describing an inversion system of the PV system to the operator of the electrical grid; and the method further comprises communicating, from the PV system controller to the intermediate server, a request to convey the at least a portion of the data describing the arrangement of two or more components of the PV system and/or data indicating whether the PV system complies with the at least one PV system criterion at least one computing device associated with a municipal inspection service of a municipality in which the premises are located.

12. The method of claim 11, wherein:

the method further comprises receiving, at the PV system controller, a first approval of the PV system from the municipal inspection service and a second approval from the operator of the PV system from the operator of the electrical grid; and activating the PV system and/or notifying a user of the PV system that the PV system complies with the at least one PV system criterion in response to determining that the PV system complies with the at least one PV system criterion comprises:
  activating the PV system and/or notifying a user of the PV system that the PV system complies with the at least one PV system criterion in response to receiving the first approval and the second approval.

13. The method of claim 1, wherein the at least one PV system criterion comprises one or more safety criteria applicable to the PV system and/or one or more regulatory criteria applicable to the PV system.

14. The method of claim 1, wherein:
the premises is a residence; and
the PV system is installed at the residence.

15. The method of claim 1, wherein activating the PV system and/or notifying a user of the PV system that the PV system complies with the at least one PV system criterion comprises:
  prompting a user to connect the PV system to the electrical grid.

16. The method of claim 15, further comprising:
  prior to the prompting, configuring the PV system to permit the PV system to be connected to the electrical grid; and
  in response to receiving, following the prompting, a user input instructing connection of the PV system to the electrical grid, connecting the PV system to the electrical grid.

17. The method of claim 16, further comprising:
  prior to obtaining the data describing the arrangement of the two or more components of the PV system, configuring the PV system to prevent the PV system from being connected to the electrical grid.

18. At least one non-transitory computer-readable storage medium having encoded thereon executable instructions that, when executed by at least one processor of a photovoltaic (PV) system controller of a PV system to be installed at a premises, cause the at least one processor to carry out a method for commissioning the PV system, the PV system comprising a plurality of PV panels and electrical components to connect the plurality of PV panels and an electrical grid, the PV system further comprising a PV system controller comprising at least one processor and at least one transceiver to communicate from the PV system to one or more devices outside the premises, the method comprising:
  obtaining, with the PV system controller of the PV system, data describing an arrangement of two or more components of the PV system, the two or more components comprising at least some of the plurality of PV panels and at least some of the electrical components of the PV system;
  performing, with the at least one processor, a test of the PV system, wherein performing the test includes determining, based, at least in part, on at least a portion of the data describing the arrangement of the two or more components of the PV system, whether the PV system complies with at least one PV system criterion, wherein determining whether the PV system complies with at least one PV system criterion comprises:
    comparing the arrangement of the two or more components of the PV system to an arrangement of components in a PV system specification; and
    determining whether the arrangement of the two or more components of the PV system matches the arrangement of components in the PV system specification;
  sending, to a regulatory entity, at least a portion of the data describing the arrangement of two or more components of the PV system and/or data indicating whether the PV system complies with the at least one PV system criterion; and
  in response to determining that the PV system complies with the at least one PV system criterion, activating the PV system and/or notifying a user of the PV system that the PV system complies with the at least one PV system criterion.

19. A method for commissioning a photovoltaic (PV) system to be installed at a premises, the PV system comprising a plurality of PV panels and electrical components to connect the plurality of PV panels and an electrical grid, the PV system further comprising a PV system controller comprising at least one processor and at least one transceiver to communicate from the PV system to one or more devices outside the premises, the method comprising:
  obtaining, with the PV system controller of the PV system, data describing an arrangement of two or more components of the PV system, the two or more components comprising at least some of the plurality of PV panels and at least some of the electrical components of the PV system;
  performing, with the at least one processor, a test of the PV system, wherein performing the test includes determining, based, at least in part, on at least a portion of the data describing the arrangement of the two or more components of the PV system, whether the PV system complies with at least one PV system criterion, wherein determining whether the PV system complies with at least one PV system criterion comprises:
    comparing the arrangement of the two or more components of the PV system to an arrangement of components in a PV system specification; and
    determining whether the arrangement of the two or more components of the PV system matches the arrangement of components in the PV system specification;
  sending, to an operator of the electrical grid, a power rating of the PV system, an address of a premises associated with the PV system, and/or information describing an inversion system of the PV system; and
  in response to determining that the PV system complies with the at least one PV system criterion, activating the PV system and/or notifying a user of the PV system that the PV system complies with the at least one PV system criterion.

20. The method of claim 19, wherein:
obtaining the data describing the arrangement of the two or more components of the PV system comprises obtaining data describing a topology of electrical connections among the two or more components of the PV system,
comparing the arrangement of the two or more components of the PV system to an arrangement of components in a PV system specification comprises comparing the topology of electrical connections among the two or more components of the PV system to a topology of electrical connections in the PV system specification, and
determining whether the arrangement of the two or more components of the PV system matches the arrangement of components in the PV system specification comprises determining whether the topology of electrical connections among the two or more components of the PV system matches the topology of electrical connections in the PV system specification.

* * * * *